(12) United States Patent
Yamada et al.

(10) Patent No.: US 8,600,752 B2
(45) Date of Patent: Dec. 3, 2013

(54) SEARCH APPARATUS, SEARCH METHOD, AND PROGRAM

(75) Inventors: Keiichi Yamada, Tokyo (JP); Hitoshi Honda, Kanagawa (JP)

(73) Assignee: Sony Corporation, Tokyo (JP)

( * ) Notice: Subject to any disclaimer, the term of this patent is extended or adjusted under 35 U.S.C. 154(b) by 384 days.

(21) Appl. No.: 13/110,338

(22) Filed: May 18, 2011

(65) Prior Publication Data

US 2011/0313773 A1    Dec. 22, 2011

(30) Foreign Application Priority Data

May 25, 2010   (JP) ................................ P2010-119767

(51) Int. Cl.
   *G10L 15/04*   (2013.01)
(52) U.S. Cl.
   USPC ........................................................ 704/254
(58) Field of Classification Search
   USPC .................. 704/230–257, 270, 275
   See application file for complete search history.

(56) References Cited

U.S. PATENT DOCUMENTS

| 6,556,970 | B1 * | 4/2003 | Sasaki et al. ................... | 704/257 |
| 8,200,480 | B2 * | 6/2012 | Shechtman et al. ........... | 704/201 |
| 8,306,810 | B2 * | 11/2012 | Li .................................. | 704/251 |
| 2008/0172224 | A1 * | 7/2008 | Liu et al. ........................ | 704/254 |
| 2009/0150148 | A1 * | 6/2009 | Abe ............................... | 704/251 |
| 2009/0313019 | A1 * | 12/2009 | Kato et al. ..................... | 704/254 |

FOREIGN PATENT DOCUMENTS

JP   2000-348064   12/2000
JP   2001-242884   9/2001

* cited by examiner

*Primary Examiner* — Abul Azad
(74) *Attorney, Agent, or Firm* — Finnegan, Henderson, Farabow, Garrett & Dunner, LLP

(57) ABSTRACT

A search apparatus includes a sound recognition unit which recognizes input sound, a user information estimation unit which estimates at least one of a physical condition and emotional demeanor of a speaker of the input sound based on the input sound and outputs user information representing the estimation result, a matching unit which performs matching between a search result target pronunciation symbol string and a recognition result pronunciation symbol string for each of plural search result target word strings, and a generation unit which generates a search result word string as a search result for a word string corresponding to the input sound from the plural search result target word strings based on the matching result. At least one of the matching unit and the generation unit changes processing in accordance with the user information.

12 Claims, 23 Drawing Sheets

FIG. 9

| SEARCH RESULT TARGET PRONUNCIATION SYMBOL STRING | SEARCH RESULT TARGET VECTOR (SPARSE VECTOR) | | | | | | | | | | | | | | | | |
|---|---|---|---|---|---|---|---|---|---|---|---|---|---|---|---|---|---|
| | A | I | U | E | O | KA | KI | KU | KE | KO | SA | SHI | SU | SE | SO | TA | CHI | TSU | TE | ... |
| SAMMA NO MAMMA | 0 | 0 | 0 | 0 | 0 | 0 | 0 | 0 | 0 | 0 | 1 | 0 | 0 | 0 | 0 | 0 | 0 | 0 | 0 | |
| SEKAI ISAN | 0 | 1 | 0 | 0 | 0 | 1 | 0 | 0 | 0 | 0 | 1 | 0 | 0 | 1 | 0 | 0 | 0 | 0 | 0 | |
| SUPAIDA MAN | 0 | 1 | 0 | 0 | 0 | 0 | 0 | 0 | 0 | 0 | 0 | 0 | 1 | 0 | 0 | 0 | 0 | 0 | 0 | |
| ASU NO TENKI | 1 | 0 | 0 | 0 | 0 | 0 | 1 | 0 | 0 | 0 | 0 | 0 | 1 | 0 | 0 | 0 | 0 | 0 | 1 | |

EXTRACTION OF VECTOR WITH COMPONENT VALUE EXCEPT 0

| SEARCH RESULT TARGET PRONUNCIATION SYMBOL STRING | VECTOR SUBSTITUTION INFORMATION | | | | | | | |
|---|---|---|---|---|---|---|---|---|
| | 1 | 2 | 3 | 4 | 5 | 6 | 7 | 8 |
| SAMMA NO MAMMA | SA | NO | MA | MA (2) | MA (3) | N | N (2) | |
| SEKAI ISAN | I | I (2) | KA | SA | SE | N | | |
| SUPAIDA MAN | I | SU | PA | MA | N | DA | | |
| ASU NO TENKI | A | KI | SU | TE | NO | N | | |

FIG. 10

| RECOGNITION RESULT PRONUNCIATION SYMBOL STRING | VECTOR SUBSTITUTION INFORMATION OF SOUND RECOGNITION RESULT | | | | | | | |
|---|---|---|---|---|---|---|---|---|
| | 1 | 2 | 3 | 4 | 5 | 6 | 7 | 8 |
| SAMMA NO MAMMA | SA | NO | MA | MA (2) | MA (3) | N | N (2) | |

DISTANCE CALCULATION BETWEEN A RECOGNITION RESULT PRONUNCIATION SYMBOL STRING AND A SEARCH RESULT TARGET PRONUNCIATION SYMBOL IS PERFORMED.
INNER PRODUCT BETWEEN A RECOGNITION RESULT VECTOR AND A SEARCH RESULT TARGET VECTOR CAN BE CALCULATED BY REFERRING TO BOTH COMPONENTS AND INCREMENTING THE VALUE BY 1 WHEN THE SAME PRONUNCIATION SYMBOLS ARE PRESENT.

| SEARCH RESULT TARGET PRONUNCIATION SYMBOL STRING | VECTOR SUBSTITUTION INFORMATION OF SEARCH RESULT TARGET WORD STRING | | | | | | | |
|---|---|---|---|---|---|---|---|---|
| | 1 | 2 | 3 | 4 | 5 | 6 | 7 | 8 |
| SAMMA NO MAMMA | SA | NO | MA | MA (2) | MA (3) | N | N (2) | |
| SEKAI ISAN | I | I (2) | KA | SA | SE | N | | |
| SUPAIDA MAN | I | SU | PA | MA | N | DA | | |
| ASU NO TENKI | A | KI | SU | TE | NO | N | | |

FIG. 18

| | EXAMPLES OF SEARCH RESULT WORD STRINGS FOR WOMEN | | EXAMPLES OF SEARCH RESULT WORD STRINGS FOR MEN |
|---|---|---|---|
| | DISPLAY EXAMPLES OF SEARCH RESULT WORD STRINGS | | DISPLAY EXAMPLES OF SEARCH RESULT WORD STRINGS |
| 1 | KYO NO RYORI "TEZUKURI SUITSU" (TODAY'S COOKING "HANDMADE SWEETS") | 1 | OTOKO NO RYORI KYOSHITSU (MAN'S COOKING SCHOOL) |
| 2 | KYO NO RYORI "HOTTO SURU OYATSU" (TODAY'S COOKING "RELAXING SNACK") | 2 | KYO NO RYORI SUPESHARU "OTOKO NO UDEMAKURI" (TODAY'S COOKING SPECIAL "MAN'S ROLLING UP THEIR SLEEVES") |
| 3 | 3-PUN KUKKINGU "DAIETTO SHUSHOKU 2-SHU" (THREE-MINUTE COOKING "TWO KINDS OF MAIN DISH FOR DIET") | 3 | OTOKO NO RYORI DO (MAN'S WAY OF COOKING) |
| 4 | KYO NO RYORI "KOTOSHI WA TEZUKURI BENTO HA" (TODAY'S COOKING "BE A PERSON WHO PACKS HIS/HER HANDMADE LUNCH THIS YEAR") | 4 | RYORI NO GOKUI -OTOKO GA TSUKURU AIJO RYORI- (SECRET OF COOKING -MAN'S LOVING COOKING-) |
| 5 | MAMA GA RYORI WO TSUKURU RIYU (WHY MY MOTHER COOKS) | 5 | KYO NO RYORI "OTOSAN NO IPPIN MEIJIN JUKU" (TODAY'S COOKING "SCHOOL FOR FATHER'S BEST ONE DISH") |

FIG. 19

EXAMPLES OF SEARCH RESULT WORD STRINGS IN NORMAL MODE

| | DISPLAY EXAMPLES OF SEARCH RESULT WORD STRINGS |
|---|---|
| 1 | KYO NO RYORI "OO SHINAI RYORI JUTSU" (TODAY'S COOKING "COOKING METHOD WITHOUT DOING OO") |
| 2 | KYO NO RYORI "KORE GA TEIBAN! SATOIMO RYORI" (TODAY'S COOKING "THIS IS STANDARD! SATOIMO COOKING") |
| 3 | KYO NO RYORI "RYORI NO KIHON WO MI NI TSUKEYO" (TODAY'S COOKING "LET'S LEARN THE BASIC OF COOKING") |
| 4 | KYO NO RYORI "FUTARIBUN SHINPURU SYOGATSU RYORI" (TODAY'S COOKING "SIMPLE NEW YEAR COOKING FOR TWO") |
| 5 | KYO NO RYORI "GOHAN GA SUSUMU RAKURAKU SAKANA RYORI" (TODAY'S COOKING "EASY FISH COOKING SUITABLE FOR RICE") |

EXAMPLES OF SEARCH RESULT WORD STRINGS SPECIALIZED IN INDIVIDUAL UTTERER (SEARCH RESULT WORD STRINGS IN RELEVANT WORD USAGE SORTING MODE)

| | DISPLAY EXAMPLES OF SEARCH RESULT WORD STRINGS |
|---|---|
| 1 | SYOKUSAI ROMAN "WAGA SEISHUN NO RYORI" (ROMANTIC BEAUTIFUL FOOD "COOKING OF MY PASSIONATE DAYS") |
| 2 | SYOKUSAI ROMAN "JAZU TO WAIN TO RYORI TO" (ROMANTIC BEAUTIFUL FOOD "JAZZ, WINE, AND COOKING") |
| 3 | SHOKUSAI ROMAN "KATEI GA TANOSHII TSURI TO RYORI" (ROMANTIC BEAUTIFUL FOOD "FISHING AND COOKING WITH ENJOYABLE PROCESS") |
| 4 | SYOKUSAI ROMAN "JIKAN GA SODATERU RYORI TO SHOSETSU" (ROMANTIC BEAUTIFUL FOOD "COOKING AND NOVEL MATURED OVER TIME") |
| 5 | SYOKUSAI ROMAN "RYORI GA SASAERU YAKUSYA JINSEI" (ROMANTIC BEAUTIFUL FOOD "ACTOR'S LIFE SUPPORTED BY COOKING") |

FIG. 22

EXAMPLES OF SEARCH RESULT WORD STRINGS IN NORMAL MODE

| | DISPLAY EXAMPLES OF SEARCH RESULT WORD STRINGS |
|---|---|
| 1 | ZA SEKAI ISAN (THE WORLD HERITAGE) |
| 2 | SIRIZU SEKAI ISAN 100 (WORLD HERITAGE SERIES 100) |
| 3 | TANKEN ROMAN SEKAI ISAN (EXPLORATION ROMANTIC WORLD HERITAGE) |
| 4 | CHUGOKU SEKAI ISAN MONOGATARI (CHINESE WORLD HERITAGE STORY) |
| 5 | SEKAI NO SORA (WORLD SKY) |
| 6 | KENJA NO ISAN (HERITAGE OF WISE MAN) |
| 7 | SEKAI NO SHASOU (WORLD FROM CAR WINDOW) |
| 8 | NIPPON ISAN (JAPANESE HERITAGE) |

EXAMPLES OF SEARCH RESULT WORD STRINGS IN WEIGHTING MATCHING MODE

| | DISPLAY EXAMPLES OF SEARCH RESULT WORD STRINGS |
|---|---|
| 1 | ZA SEKAI ISAN (THE WORLD HERITAGE) |
| 2 | SIRIZU SEKAI ISAN 100 (WORLD HERITAGE SERIES 100) |
| 3 | TANKEN ROMAN SEKAI ISAN (EXPLORATION ROMANTIC WORLD HERITAGE) |
| 4 | CHUGOKU SEKAI ISAN MONOGATARI (CHINESE WORLD HERITAGE STORY) |
| 5 | KENJA NO ISAN (HERITAGE OF WISE MAN) |
| 6 | NIPPON ISAN (JAPANESE HERITAGE) |
| 7 | TOKYO RETORO ISAN (TOKYO RETRO HERITAGE) |
| 8 | REKISHI ROMAN SANGYO ISAN 2 (ROMANTIC HISTORY INDUSTRIAL HERITAGE 2) |

SEARCH APPARATUS, SEARCH METHOD, AND PROGRAM

BACKGROUND

The present disclosure relates to a search apparatus, a search method, and a program, and particularly to a search apparatus, a search method, and a program capable of obtaining flexible search results in sound search.

As a sound search method which uses sound input by a user for searching a word string such as a set of text corresponding to the sound, a method using only a sound recognition apparatus is exemplified (see Japanese Unexamined Patent Application Publication No. 2001-242884, for example).

In the sound search using only a sound recognition apparatus, sound recognition is performed on input sound while word (vocabulary) sequences registered in advance in a dictionary are used as targets of a sound recognition result in a sound recognition apparatus, and the sound recognition result is output as a search result word string which is the result of the search for the word string corresponding to the input sound.

Accordingly, since the word string as the target of the search result for the word string corresponding to the input sound (hereinafter, also referred to as a search result target word string) is limited to the word string (including one word in this specification) as the sequence of words registered in a dictionary, which is the target of the sound recognition result, in the sound search using only a sound recognition apparatus, utterances of a user are restricted to the sequences of words registered in the dictionary used for sound recognition.

Thus, a sound search method called voice search has been proposed in recent years.

According to the voice search, a language model such as N-gram or the like is used to perform sequential sound recognition, and matching between the sound recognition result and the sets of text registered in a DB (database) separately prepared in addition to a dictionary to be used for sound recognition (search for sets of text corresponding to a sound recognition result from the sets of text registered in the DB) is performed.

Then, the highest ranking set of text or the highest ranking N sets of text which match the sound recognition result are output as search result word strings based on the matching result.

According to the voice search, since the sets of text registered in the DB separately prepared in addition to the dictionary to be used for sound recognition become search result target word strings, it is possible to perform sound search by registering many sets of text in the DB and using the many sets of text as the search result target word strings.

That is, according to the voice search, it is possible to perform sound search with precision to some extent within the range of sets of text registered in the DB as the search result target word strings even for the utterance of a user including words other than the words registered in the dictionary used for sound recognition.

In addition, a method has been proposed in which sound recognition is performed on a multimedia file storing sound and images to generate sets of text for indexing from the sound in the multimedia file and the sound in the multimedia file is searched based on speaker specification (see Japanese Unexamined Patent Application Publication No. 2000-348064).

SUMMARY

According to the voice search in the related art, the same search result word string is output if a user makes the same utterance (if a user utters the same input sound).

That is, according to the voice search in the related art, the search result word string which can be obtained when user A makes a certain utterance U can also be obtained when user B makes the same utterance U.

However, user A and user B who is different from the user A, that is, a male user A and a female user B, for example, desire different search result word strings while making the same utterance in some cases.

Accordingly, there is demand for voice search in which different and flexible search result word strings can be obtained depending on the user (speaker).

The present disclosure was made in view of the above circumstances, and it is desirable to make it possible to obtain a flexible search result in sound search.

A search apparatus or a program which causes a computer to function as such a search apparatus according to an embodiment of the present disclosure includes a sound recognition unit which recognizes input sound, a user information estimation unit which estimates at least one of a physical condition and emotional demeanor of a speaker of the input sound based on the input sound and outputs user information representing the estimation result, a matching unit which performs matching between a search result target pronunciation symbol string which is a sequence of pronunciation symbols representing pronunciations of a search result target word string and a recognition result pronunciation symbol string which is a sequence of pronunciation symbols representing pronunciations of a sound recognition result for the input sound for each of plural search result target word strings which are word strings as the targets of the search results for the word strings corresponding to the input sound, and a generation unit which generates a search result word string as a search result for a word string corresponding to the input sound from the plural search result target word strings based on the matching result between the search result target pronunciation symbol string and the recognition result pronunciation symbol string, wherein at least one of the matching unit and the generation unit changes processing in accordance with the user information.

A search method by a search apparatus which searches a word string corresponding to input sound according to an embodiment of the present disclosure includes recognizing input sound, estimating at least one of a physical condition and emotional demeanor of a speaker of the input sound based on the input sound and outputting user information representing the estimation result, performing matching between a search result target pronunciation symbol string which is a sequence of pronunciation symbols representing pronunciations of a search result target word string and a recognition result pronunciation symbol string which is a sequence of pronunciation symbols representing pronunciations of a sound recognition result for the input sound for each of plural search result target word strings which are word strings as the targets of the search results for the word strings corresponding to the input sound, and generating a search result word string as a search result for a word string corresponding to the input sound from the plural search result target word strings based on the matching result between the search result target pronunciation symbol string and the recognition result pronunciation symbol string, wherein processing is changed in accordance with the user information at least in one of the performing of the matching and the generating of the search result word string.

According to an embodiment of the present disclosure as described above, input sound is recognized, at least one of a physical condition and emotional demeanor of a speaker of the input sound is estimated based on the input sound and user information representing the estimation result is output. Matching between a search result target pronunciation symbol string which is a sequence of pronunciation symbols representing pronunciations of a search result target word string and a recognition result pronunciation symbol string which is a sequence of pronunciation symbols representing pronunciations of a sound recognition result for the input sound is performed for each of plural search result target word strings which are word strings as the targets of the search results for the word strings corresponding to the input sound, and a search result word string as a search result for a word string corresponding to the input sound from the plural search result target word strings is generated based on the matching result between the search result target pronunciation symbol string and the recognition result pronunciation symbol string. In this case, processing is changed in accordance with the user information in at least one of the matching between the search result target pronunciation symbol string and the recognition result pronunciation symbol string and the generation of the search result word string.

The search apparatus may be an independent apparatus or an inner block constituting one apparatus.

In addition, the program can be provided by being transmitted through a transmitted medium or being recorded in a recording medium.

According to an embodiment of the present disclosure, it is possible to obtain a flexible search result in sound search.

BRIEF DESCRIPTION OF THE DRAWINGS

FIG. 9 is a diagram illustrating search result target vectors and vector substitution information;

FIG. 10 is a diagram illustrating calculation of a similarity degree between a sound recognition result and a search result target word string when vector substitution information is used instead of search result target vectors;

FIG. 18 is a diagram illustrating a search result word string generated in a relevant word usage sorting mode;

FIG. 19 is a diagram illustrating search result word strings which are respectively generated in a normal mode and in a relevant word usage sorting mode;

FIG. 22 is a diagram illustrating search result word strings which are respectively obtained in a normal mode and in a weighting matching mode.

DETAILED DESCRIPTION OF EMBODIMENTS

[One Embodiment of Recorder to which the Present Disclosure is Applied]

Figure 1:
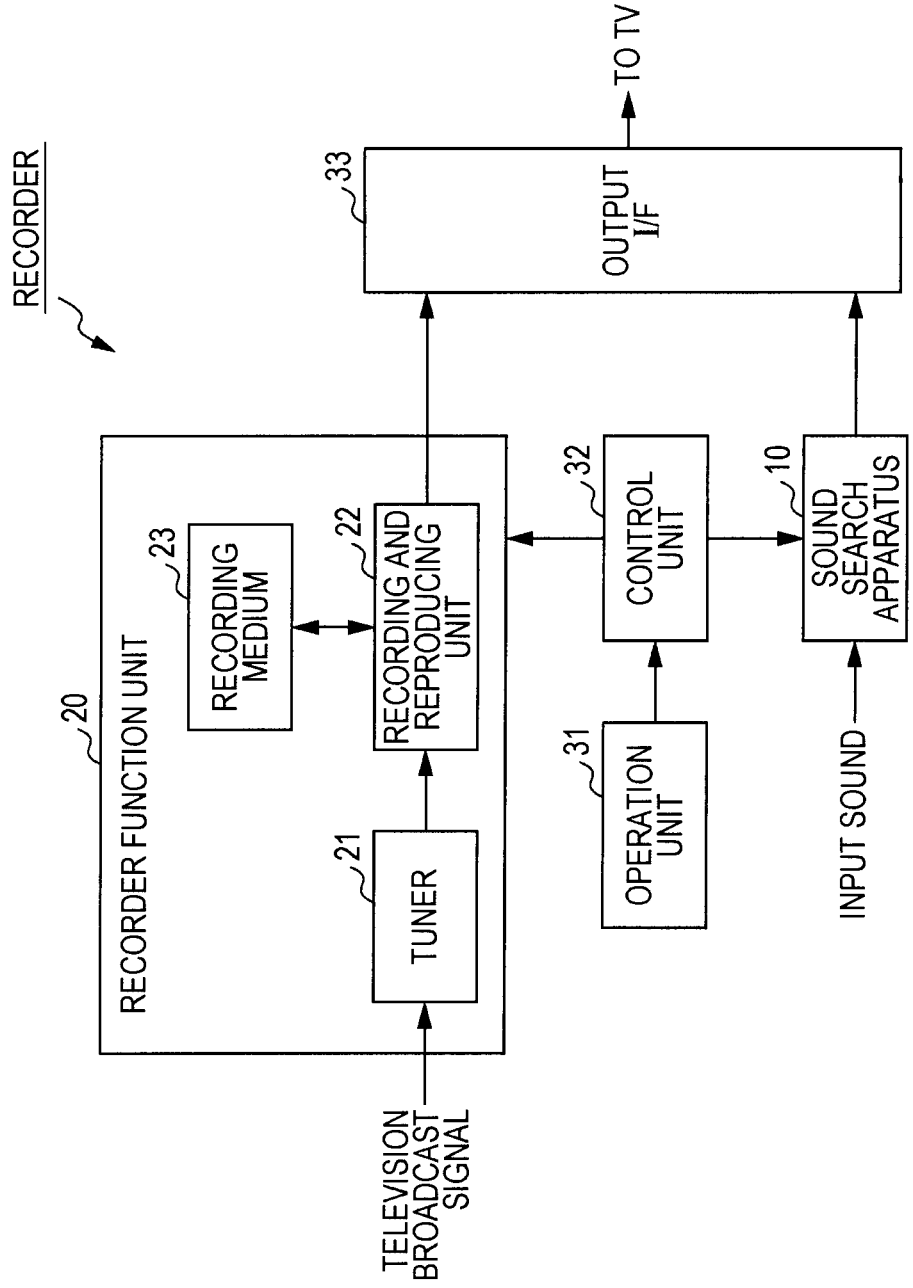
FIG. 1 is a block diagram illustrating a configuration example of a recorder according to an embodiment to which the present disclosure is applied.

FIG. 1 is a block diagram illustrating a configuration example of a recorder according to an embodiment to which a search apparatus of the present disclosure is applied.

In FIG. 1, the recorder includes a sound search apparatus 10, a recorder function unit 20, an operation unit 31, a control unit 32, and an output I/F (interface) 33.

(Data of) input sound uttered by a user is supplied to the sound search apparatus 10 through a microphone or the like which is not shown in the drawing.

The sound search apparatus 10 uses input sound supplied thereto to perform sound search by voice search, for example, and supplies the search result word string obtained as a result to the output I/F 33.

The recorder function unit 20 includes a tuner 21, a recording and reproducing unit 22, and a recording medium 23 and performs recording (video recording) and reproducing of a television broadcast program.

That is, a television broadcast signal by digital broadcast which has been received by an antenna not shown in the drawing, for example, is supplied to the tuner 21.

The tuner 21 receives the television broadcast signal supplied thereto, extracts a television broadcast signal for a predetermined channel from the television broadcast signal, demodulates a bitstream, and supplies the demodulated bitstream to the recording and reproducing unit 22.

The recording and reproducing unit 22 extracts an EPG (Electronic Program Guide), program data, and the like from the bitstream supplied by the tuner 21 and supplies them to the output I/F 33.

In addition, the recording and reproducing unit 22 records the EPG and program data (video recording) in the recording medium 23.

Moreover, the recording and reproducing unit 22 reproduces the program data from the recording medium 23 and supplies the data to the output I/F 33.

The recording medium 23 is a HD (Hard Disk) or the like, for example, and the EPG and program data are recorded in the recording medium 23 by the recording and reproducing unit 22.

The operation unit 31 includes a remote commander, a button provided on a case body of the recorder, a button displayed as a GUI (Graphics User Interface) on a display, which is not shown in the drawing, and the like. The operation unit 31 is operated by a user and supplies an operation signal corresponding to the operation to the control unit 32.

The control unit 32 controls a block constituting a recorder including the sound search apparatus 10, the recorder function unit 20, and the like and performs other processing in response to the operation signal and the like from the operation unit 31.

The EPG and the program data are supplied to the output I/F 33 from the recording and reproducing unit 22. In addition, the search result word string as a result of sound search with respect to the input sound is supplied to the output I/F 33 from the sound search apparatus 10.

In addition, the output I/F 33 is an interface connected to a display apparatus such as a TV (television receiver) or the like, which can display at least an image, and supplies the EPG and the program data from the recording and reproducing unit 22 and the search result word string from the sound search apparatus 10 to a TV, which is not shown in the drawing, for example connected to the output unit I/F 33.

[Configuration Example of Sound Search Apparatus 10]

Figure 2:
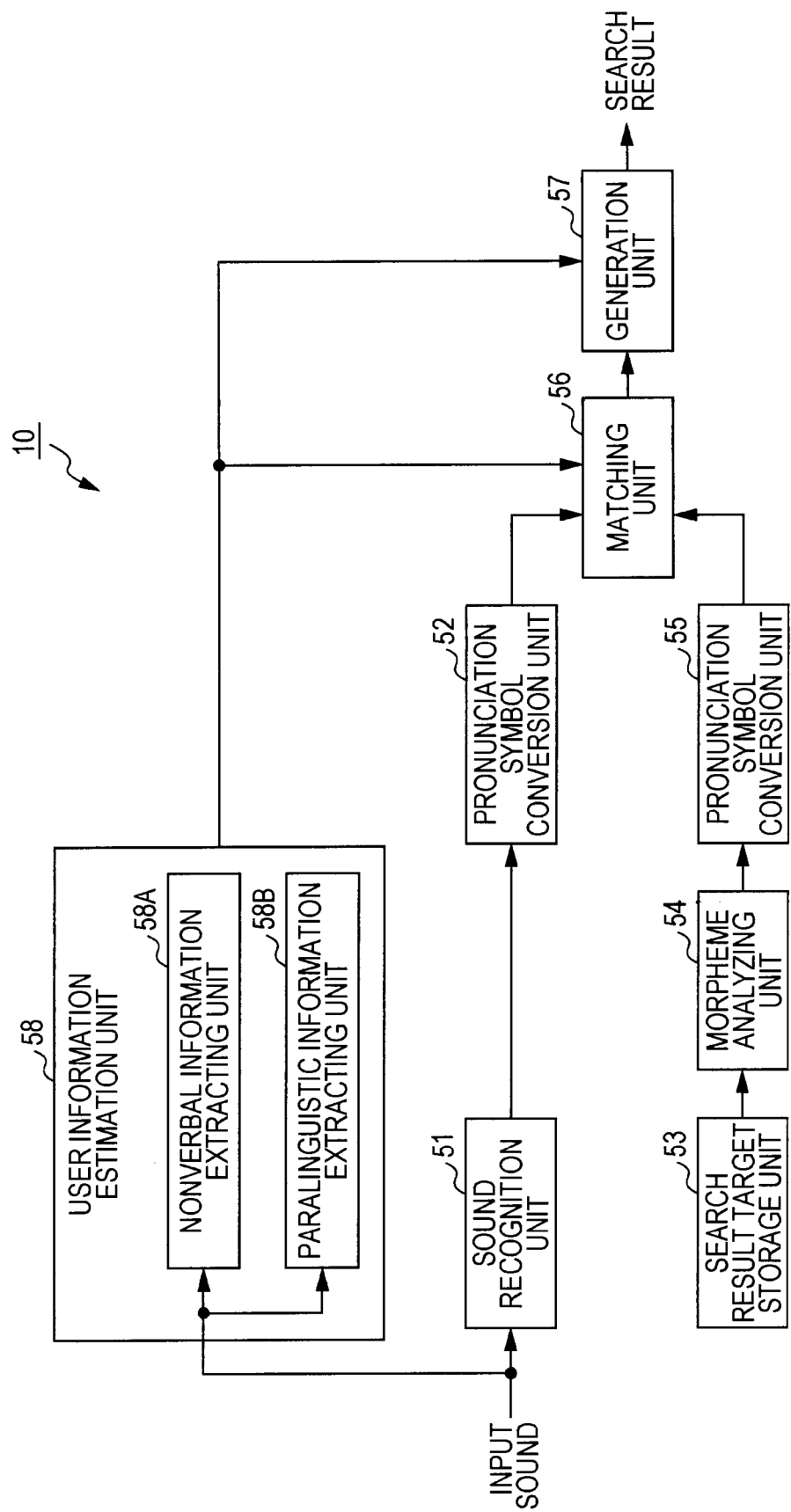
FIG. 2 is a block diagram illustrating a configuration example of a sound search apparatus.

FIG. 2 is a block diagram illustrating a configuration example of a sound search apparatus 10 in FIG. 1.

In FIG. 2, the sound search apparatus 10 includes a sound recognition unit 51, a pronunciation symbol conversion unit 52, a search result target storage unit 53, a morpheme analyzing unit 54, a pronunciation symbol conversion unit 55, a matching unit 56, a generation unit 57, and a user information estimation unit 58 and performs sound search by voice search.

Here, according to the voice search in the related art, matching between the sound recognition result and the set of text as the search result target word string is performed in units of words or in units of notation symbols using notation symbols which are symbols representing the respective notations of the audio recognition result and the search result target word string.

Accordingly, if there is an error in a notation symbol in the sound recognition result, a search result target word string which is completely different from the word string corresponding to the input sound matches the sound recognition result during matching, and as a result, such a search result target word string which is completely different from the word string corresponding to the input sound is output as the search result word string.

That is, when a user utters "TOSHINOSEKAI", for example, as the input sound, and the notation symbol string of the sound recognition result is "TOSHI NO SEKAI (world of cities)", for example, the notation symbol string of the sound recognition result "TOSHI NO SEKAI" is split into each word so as to be "TOSHI/NO/SEKAI/(world of cities)" (slash (/) represents separation) and matching is performed in units of words while the notation symbol string "TOSHI NO SEKAI (world of cities)" of the sound recognition result is split into each notation symbol so as to be "TO/SHI/NO/SE/KAI (world of cities)" and matching is performed in units of notation symbols.

On the other hand, if the notation symbol string of the sound recognition result for the input sound "TOSHINOSEKAI" is "TOSHI NO SE KAI (Is it the end of the year?)", the notation symbol string "TOSHI NO SE KAI (Is it the end of the year?)" of the sound recognition result is split into each word so as to be "/TOSHI/NO/SE/KAI/(Is it the end of the year?)" and matching is performed in units of words while the notation symbol string "TOSHI NO SE KAI (Is it the end of the year?)" of the sound recognition result is split into each notation symbol so as to be "TOSHI/NO/SE/KA/I (Is it the end of the year?)" and matching is performed in units of notation symbols.

Accordingly, the search result target word strings matching the sound recognition result are greatly different in the case where the notation symbol string of the sound recognition result for the input sound "TOSHINOSEKAI" is "TOSHI NO SEKAI (world of cities)" and in the case where the notation symbol string of the sound recognition result for the input sound "TOSHINOSEKAI" is "TOSHI NO SE KAI (Is it the end of the year?)", and as a result, a search result target word string which is completely different from the word string corresponding to the input sound is output as a search result word string while the word string corresponding to the input sound is not output as the search result word string in some cases.

As a result, the matching using notation symbols do not necessarily have an affinity with a sound recognition result, and a word string corresponding to input sound is not obtained as a search result word string in some cases.

For this reason, the sound search apparatus 10 makes it possible to perform the search for the word string corresponding to the input sound in a robust manner by using pronunciation symbols which are symbols representing the respective pronunciations of the sound recognition result and the search result target word string to perform the matching between the sound recognition result and the search result target word string and thereby prevents the word string corresponding to the input sound from not being output as the search result word string.

That is, in the sound search apparatus 10 in FIG. 2, (data of) the input sound as the user utterance is supplied to the sound recognition unit 51 from the microphone or the like which is not shown in the drawing.

The sound recognition unit 51 recognizes the input sound supplied thereto and supplies (for example, the notation symbol of) the sound recognition result to the pronunciation symbol conversion unit 52.

The pronunciation symbol conversion unit 52 converts (for example, the notation symbol of) the sound recognition result for the input sound supplied from the sound recognition unit 51 into the recognition result pronunciation symbol string with a pronunciation symbol sequence representing the pronunciation of the sound recognition result and supplies the converted recognition result pronunciation symbol string to the matching unit 56.

Matching with the sound recognition result is performed on plural search result target word strings, that is, in the matching unit 56, and the search result target storage unit 53 stores (for example, a set of text as notation symbols of) the word string which may be a search result word string as a result of the search for the word string corresponding to the input sound.

Here, a title of a program, names of performers, detailed information including contents of a program, and the like which are constituents of the EPG stored in the recording medium 23 of the recorder in FIG. 1, for example, are supplied to and stored in the search result target storage unit 53.

In addition, a title of a program, names of performers, detailed information, and the like which are metadata of a program which is video-recorded (recorded) (video-recorded program) in the recording medium 23 of the recorder in FIG. 1, for example, are supplied to and stored in the search result target storage unit 53.

Therefore, according to this embodiment, the sound search apparatus 10 performs sound search while using a title of a program, names of performers, detailed information, and the like as search result target word strings.

The morpheme analyzing unit 54 splits the search result target word string into word (morpheme) units by performing morpheme analysis on the search result target word string stored in the search result target storage unit 53 and supplies the split units to the pronunciation symbol conversion unit 55.

The pronunciation symbol conversion unit 55 converts (for example, the notation symbol of) the search result target word string supplied from the morpheme analyzing unit 54 into the search result target pronunciation symbol string as a pronunciation symbol sequence representing the pronunciation of the search result target word string and supplies the search result target pronunciation symbol string to the matching unit 56.

The matching unit 56 performs matching between the recognition result pronunciation symbol string from the pronunciation symbol conversion unit 52 and the search result target pronunciation symbol string from the pronunciation symbol conversion unit 55 and supplies the matching result to the generation unit 57.

That is, the matching unit 56 performs the matching between each of all the search result target word strings stored in the search result target storage unit 53 and the sound recognition result for the input sound with the use of the pronunciation symbol of the sound recognition result and the pronunciation symbol of the search result target word string.

The matching unit 56 performs matching between each of all the search result target word strings stored in the search result target storage unit 53 and the sound recognition result for the input sound and supplies the matching result to the generation unit 57.

In addition, in the matching between the recognition result pronunciation symbol string and the search result target pronunciation symbol string, a similarity degree representing the degree by which the recognition result pronunciation symbol string and the search result target pronunciation symbol string are similar to each other is obtained.

It is possible to use a cosine distance or the like of a vector space method, for example, as the similarity degree.

The generation unit 57 generates a search result word string as a search result for the word string corresponding to the input sound from among the search result target word strings stored in the search result target storage unit 53 based on the matching result from the matching unit 56.

That is, the generation unit 57 selects a search result target word string with the similarity degree of the highest rank as a matching result from the matching unit 56 from among the search result target word strings stored in the search result target storage unit 53 and regards the selected search result target word string as a search result word string.

The same input sound as that to be supplied to the sound recognition unit 51 is supplied to the user information estimation unit 58.

The user information estimation unit 58 estimates at least one of a physical condition and emotional demeanor of a user as a speaker of the input sound based on the input sound and outputs the user information representing the estimation result. The user information output by the user information estimation unit 58 is supplied to the matching unit 56 and the generation unit 57.

Here, the user information estimation unit 58 includes a nonverbal information extracting unit 58A and a paralinguistic information extracting unit 58B.

The nonverbal information extracting unit 58A extracts the nonverbal information as the information relating to the user's physical condition based on the input sound of the user supplied to the user information estimation unit 58.

The paralinguistic information extracting unit 58B extracts the paralinguistic information as the information relating to the attitude of mind of the user based on the input sound of the user supplied to the user information estimation unit 58.

Then, the user information estimation unit 58 supplies one or both of the nonverbal information extracted by the nonverbal information extracting unit 58A and the paralinguistic information extracted by the paralinguistic information extracting unit 58B to the matching unit 56 and the generation unit 57 as the user information.

Accordingly, the user information includes the nonverbal information and the paralinguistic information.

The nonverbal information extracting unit 58A extracts (estimates) from the input sound the information relating to the user's physical condition including the sex of the user (speaker) who uttered the input sound, the age group of the user who uttered the input sound (for example, the information regarding whether the user is a child or an adult), the information specifying which user the user who uttered the input sound corresponds to (for example, a user's name, an ID (Identification) specifying a user, and the like), and the like as nonverbal information based on the pitch detection of the user input sound, the speaker specification using user input sound, and the like, for example.

In addition, the paralinguistic information extracting unit 58B extracts (estimates) as the paralinguistic information from the input sound the information relating to the emotional demeanor such as intention, emotion, or the like of the user including the information that the user intend to emphasize a part based on the detection of prosodic information such as pitch (tone of the voice), power (volume of the voice), the utterance speed (speed of the voice) m and the like of the user's input sound, for example.

Specifically, an emphasized section in which the user makes an emphasized utterance from among the sound sections of the input sound is estimated as the paralinguistic information by the paralinguistic information extracting unit 58B, for example.

The user information estimation unit 58 supplies the aforementioned nonverbal information and the paralinguistic information to the matching unit 56 and the generation unit 57 as the user information.

In addition, at least one of the matching unit 56 and the generation unit 57 changes the processing in accordance with the user information supplied from the user information estimation unit 58.

That is, plural operation modes are prepared in the sound search apparatus 10 in FIG. 2, and the matching unit 56 and the generation unit 57 respectively perform matching processing and processing of generating a search result word string without using the user information supplied from the user information estimation unit 58 in a normal mode which is one of the plural operation modes.

In addition, the operation modes include a relevant word usage matching mode, a relevant word usage sorting mode, and a weighting matching mode, which will be described later, in addition to the normal mode.

When the relevant word usage matching mode or the weighting matching mode is set as the operation mode, the matching unit 56 performs matching processing using the user information supplied from the user information estimation unit 58 as will be described later.

In addition, when the relevant word usage sorting mode is set as the operation mode, the generation unit 57 performs the processing of generating the search result word string using the user information supplied from the user information estimation unit 58 as will be described later.

The operation mode of the sound search apparatus 10 can be set by user operation of the operation unit 31, for example.

The sound search processing based on the voice search is performed in accordance with the user utterance according to the sound search apparatus 10 as described above.

That is, when the user makes an utterance, and the input sound as the utterance is supplied to the sound recognition unit 51, the sound recognition unit 51 recognizes the input sound and supplies the sound recognition result for the input sound to the pronunciation symbol conversion unit 52.

The pronunciation symbol conversion unit 52 converts the sound recognition result for the input sound from the sound recognition unit 51 into the recognition result pronunciation symbol string and supplies the recognition result pronunciation symbol string to the matching unit 56.

On the other hand, the morpheme analyzing unit 54 performs morpheme analysis on all search result target word strings stored in the search result target storage unit 53 and supplies the search result target word strings to the pronunciation symbol conversion unit 55.

The pronunciation symbol conversion unit 55 converts the search result target word strings from the morpheme analyzing unit 54 into the search result target pronunciation symbol string and supplies the search result target pronunciation symbol strings to the matching unit 56.

The matching unit 56 performs matching between each of all the search result target word strings stored in the search result target storage unit 53 and the sound recognition result for the input sound using the recognition result pronunciation symbol string from the pronunciation symbol conversion unit 52 and the search result target pronunciation symbol string from the pronunciation symbol conversion unit 55 and supplies the matching result to the generation unit 57.

The generation unit 57 selects and outputs (the search result target word string which is assumed to be) the search result word string as the result of the search for the word string corresponding to the input sound from among the search result target word strings stored in the search result target storage unit 53 based on the matching result from the matching unit 56.

Accordingly, the user can obtain (the search result target word string as) the search result word string which matches the user utterance from among the search result target word strings stored in the search result target storage unit 53 by merely making an utterance.

In addition, the input sound which the user has uttered is supplied not only to the sound recognition unit 51 but also to the user information estimation unit 58 in the sound search apparatus 10. The user information estimation unit 58 estimates the user information based on the input sound supplied thereto and supplies the estimated user information to the matching unit 56 and the generation unit 57.

The matching unit 56 and the generation unit 57 respectively perform processing with or without the use of the information from the user information estimation unit 58 in accordance with the operation mode.

According to the recorder in FIG. 1 having the sound search apparatus 10 as described above, it is possible to search and reproduce a program desired by a user by sound search from among the programs which were video-recorded (video-recorded programs), for example.

That is, if a user utters input sound "SEKAI ISAN (world heritage)", for example, as a keyword for sound search of a program to be reproduced, the sound search apparatus 10 generates a predetermined number of program titles which have similar pronunciation to the input sound "SEKAI ISAN (world heritage)" as search result word strings by performing sound search on the titles and the like of the video-recorder programs stored in the search result target storage unit 53 as the search result target word strings and supplies the generated search result word strings to the output I/F 33.

Then, the output I/F 33 causes the program titles as the search result word strings to be displayed (on a TV (television receiver) or the like connected to the recorder) as candidate programs to be reproduced (reproduction candidate programs).

Thereafter, when the user selects one program to be reproduced from among the reproduction candidate programs by operating the operation unit 31 or the like, the recorder function unit 20 reproduces the program.

Although two pronunciation symbol conversion units 52 and 55 are provided in FIG. 2, it is possible to realize the two pronunciation symbol conversion unit 52 and 55 by one pronunciation symbol conversion unit.

Although description was made of FIG. 2 in which (the sets of text as) the notation symbols of the search result target word strings are stored in the search result target storage unit 53, it is also possible to allow the search result target storage unit 53 to store not only (the notation symbols of) the search result target word strings but also the search result target pronunciation symbol strings obtained by converting the search result target word strings into pronunciation symbols.

In this case, it is possible to configure the sound search apparatus 10 without providing the morpheme analyzing unit 54 and the pronunciation symbol conversion unit 55.

Although the description was made of FIG. 2 in which the sound recognition unit 51 performs sound recognition for the input sound and outputs the notation symbol of the sound recognition result, it is also possible to allow the sound recognition unit 51 to output the pronunciation symbol of the sound recognition result (recognition result pronunciation symbol string).

In this case, it is possible to configure the sound search apparatus 10 without providing the pronunciation symbol conversion unit 52.

[Matching by Matching Unit 56]

Description will be made of matching by the matching unit 56 in FIG. 2 with reference to FIGS. 3 to 10.

Figure 3:
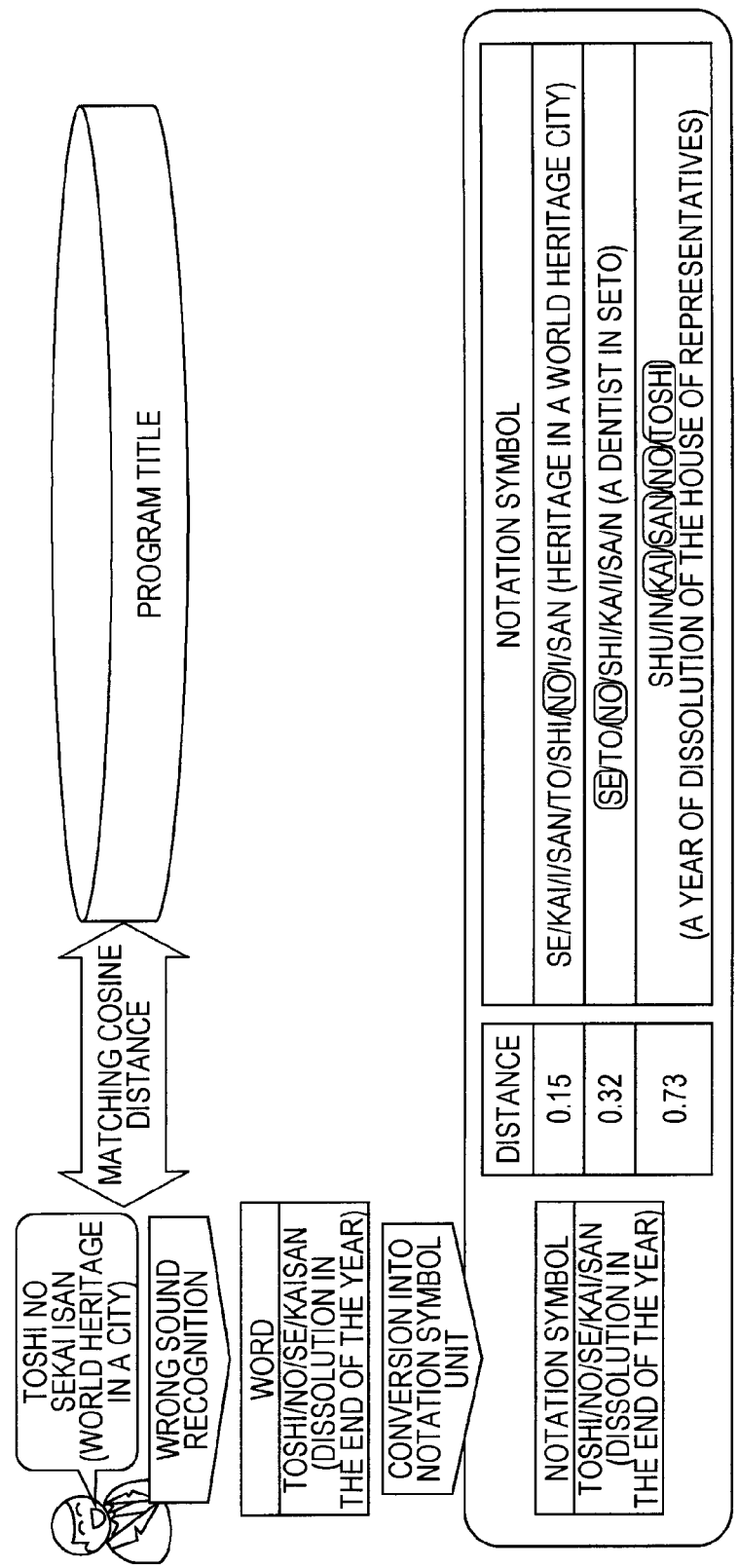
FIG. 3 is a diagram illustrating that it is not advantageous for sound search performance that different matching results are obtained for sound recognition results with respect to the utterances expressed by different notations in matching using notation symbols.

FIG. 3 is a diagram illustrating matching between the sound recognition result and the set of text as the search result target word string, which is performed using notation symbols which represent each of the sound recognition result and the search result target word string.

Here, the notation symbols do not coincide with the pronunciation in some cases.

Specifically, although the pronunciation (reading) of hiragana "ha" is "HA" in some cases or "WA" in other cases, the difference in pronunciation is not expressed by the notation symbol.

In addition, as for Chinese characters with plural readings such as "shi", for example, whether the reading (pronunciation) is "SHI" or "ICHI" is not expressed by the notation symbol.

On the other hand, word strings "TOSHI NO SEKAI ISAN (world heritage in a city)" and "TOSHI NO SE KAISAN (breaking up for the end of year)" expressed by notation symbols have the same pronunciations but different notation symbols other than "NO", for example.

For this reason, different matching results are obtained in the matching using notation symbols when the sound recognition result is "TOSHI NO SEKAI ISAN (world heritage in a city)" and when the sound recognition result is "TOSHI NO SE KAISAN (breaking up at the end of the year)", which is not necessarily advantageous for the sound search performance.

That is, FIG. 3 is a diagram illustrating that it is not advantageous for sound search performance that different matching results are obtained for sound recognition results with respect to the utterances expressed with the same pronunciations and the different notations in matching using notation symbols.

In FIG. 3, the input sound "TOSHI NO SEKAI ISAN (world heritage in a city)" is subjected to sound recognition, and the sound recognition result "TOSHI NO SE KAISAN (breaking up at the end of the year)" which has the same pronunciation as that of the input sound "TOSHI NO SEKAI ISAN (world heritage in a city)" and different notation is erroneously obtained.

In FIG. 3, the sound recognition result "TOSHI NO SE KAISAN (breaking up at the end of the year)" is split into notation symbol units so as to be "TOSHI/NO/SE/KAISAN (breaking up at the end of the year)" (slash (/) represents separation), and matching is performed in units of notation symbols.

Moreover, three program titles including "SEKAI ISAN TOSHI NO ISAN (heritage in a world heritage city)", "SETO NO HAISHA SAN (a dentist in Seto)", and "SHUIN KAISAN NO TOSHI (a year in which dissolution of the house of representatives occurs) are prepared as the search result target word strings to be subjected to matching in FIG. 3, for example.

Only one notation symbol "NO" circled in the drawing coincides with the sound recognition result "TOSHI NO SE KAISAN (breaking up at the end of the year)" and the search result target word string "SEKAI ISAN TOSHI NO ISAN (heritage in a world heritage city)" in terms of units of notation symbols.

In addition, two notation symbols "SE" and "NO" circled in the drawing coincide with the sound recognition result "TOSHI NO SE KAISAN (breaking up at the end of the year)" and the search result target word string "SETO NO HAISHA SAN (a dentist in Seto)" in terms of units of notation symbols.

Moreover, four notation symbols "KAI", "SAN", "NO", and "TOSHI" circled in the drawing coincide with the sound recognition result "TOSHI NO SE KAISAN (breaking up at the end of the year)" and the search result target word string "SHUIN KAISAN NO TOSHI (a year in which dissolution of the house of representatives occurs)" in terms of units of notation symbols.

Accordingly, as for the similarity degree between the sound recognition result and the search result target word string, which is obtained in the matching in units of notation symbols, the similarity degree between the sound recognition result "TOSHI NO SE KAISAN (breaking up at the end of the year)" and the search result target word string "SHUIN KAI-SAN NO TOSHI (a year in which dissolution of the house of representatives occurs)" is the highest.

That is, a cosine distance is employed, for example, as the similarity degree obtained in the matching in units of notation symbols.

In addition, vectors expressing a component corresponding to a notation symbol which is present in a word string with 1 and expressing a component corresponding to a notation symbol which is not present in the word string with 0 are employed as vectors expressing the word string, and a cosine distance as a similarity degree between two word strings is obtained using vectors expressing the two word strings.

In this case, 0.15 is obtained as the similarity degree between the sound recognition result "TOSHI NO SE KAISAN (breaking up at the end of the year)" and the search result target word string "SEKAI ISAN TOSHI NO ISAN (heritage in a world heritage city)", 0.32 is obtained as the similarity degree between the sound recognition result "TOSHI NO SE KAISAN (breaking up at the end of the year)" and the search result target word string "SETO NO HAISHA SAN (a dentist in Seto)", and 0.73 is obtained as the similarity degree between the sound recognition result "TOSHI NO SE KAISAN (breaking up at the end of the year)" and the search result target word string "SHUIN KAI-SAN NO TOSHI (a year in which dissolution of the house of representatives occurs)" in the matching of units of notation symbols.

Accordingly, for example, if the search result target word string with the highest ranked similarity degree which is obtained as a result of matching is assumed to be the search result word string, and even when the sound recognition for the input sound "TOSHI NO SEKAI ISAN (world heritage in a city)" is erroneous, and the sound recognition result "TOSHI NO SE KAISAN (breaking up at the end of the year)" is obtained, "SHUIN KAISAN NO TOSHI (a year in which dissolution of the house of representatives occurs)" is regarded as the search result word string from among the three program titles including "SEKAI ISAN TOSHI NO ISAN (heritage in a world heritage city)", "SETO NO HAISHA SAN (a dentist in Seto)", and "SHUIN KAISAN NO TOSHI (a year in which dissolution of the house of representatives occurs)" as the search result target word strings.

It is appropriate that the first program title "SEKAI ISAN TOSHI NO ISAN (heritage in a world heritage city)" is regarded as the search result word string from among the aforementioned three program titles including "SEKAI ISAN TOSHI NO ISAN (heritage in a world heritage city)", "SETO NO HAISHA SAN (a dentist in Seto)", and "SHUIN KAI-SAN NO TOSHI (a year in which dissolution of the house of representatives occurs)" with respect to the input sound "TOSHI NO SEKAI ISAN (world heritage in a city)".

However, if the sound recognition for the input sound "TOSHI NO SEKAI ISAN (world heritage in a city)" is erroneously performed, and "TOSHI NO SE KAISAN (breaking up at the end of the year)" which has the same pronunciation (reading) and different notation is obtained, not the appropriate program title "SEKAI ISAN TOSHI NO ISAN (heritage in a world heritage city)" with respect to the input sound "TOSHI NO SEKAI ISAN (world heritage in a city)" but the program title "SHUIN KAISAN NO TOSHI (a year in which dissolution of the house of representatives occurs)" which has nothing to do with "TOSHI NO SEKAI ISAN (world heritage in a city)" is obtained as the search result word string.

In addition, when "TOSHI NO SEKAI ISAN (world heritage in a city)" with the same notation is obtained as the sound recognition result for the input sound "TOSHI NO SEKAI ISAN (world heritage in a city)", the similarity degree to the program title "SEKAI ISAN TOSHI NO ISAN (heritage in a world heritage city)" which is appropriate for the input sound "TOSHI NO SEKAI ISAN (world heritage in a city)" is the highest rank, and "SEKAI ISAN TOSHI NO ISAN (heritage in a world heritage city)" is obtained as the search result word string.

As described above, a different matching result (similarity degree between the sound recognition result and each search result target word string) is obtained in matching using notation symbols when the sound recognition result is "TOSHI NO SEKAI ISAN (world heritage in a city)" and when the sound recognition result is "TOSHI NO SE KAISAN (breaking up at the end of the year)", and as a result, the program title "SEKAI ISAN TOSHI NO ISAN (heritage in a world heritage city)" which is appropriate for the input sound "TOSHI NO SEKAI ISAN (world heritage in a city)" is obtained as a search result target word string in some cases, and such an appropriate title is not obtained as a search result word string, and the program title "SHUIN KAISAN NO TOSHI (a year in which dissolution of the house of representatives occurs)" which has nothing to do with the input sound "TOSHI NO SEKAI ISAN (world heritage in a city)" is obtained as the search result word string in other cases.

Thus, the matching unit 56 in the sound search apparatus 10 (FIG. 2) performs matching with the use of pronunciation symbols in order to prevent the program title which is appropriate for the input sound from not being output as the search result word string.

Here, the pronunciation symbol is a symbol expressing a syllable or phoneme, for example, and it is possible to employ hiragana, for example, for Japanese, which expresses the reading.

In matching with the use of the pronunciation symbols, it is possible to employ (one) syllable, a two or more syllable concatenation, (one) phoneme, a two or more phoneme concatenation, or the like as a unit of matching.

In addition, matching results and thus sound search performance is different depending on which matching unit is employed in matching with the use of the pronunciation symbols.

Figure 4:
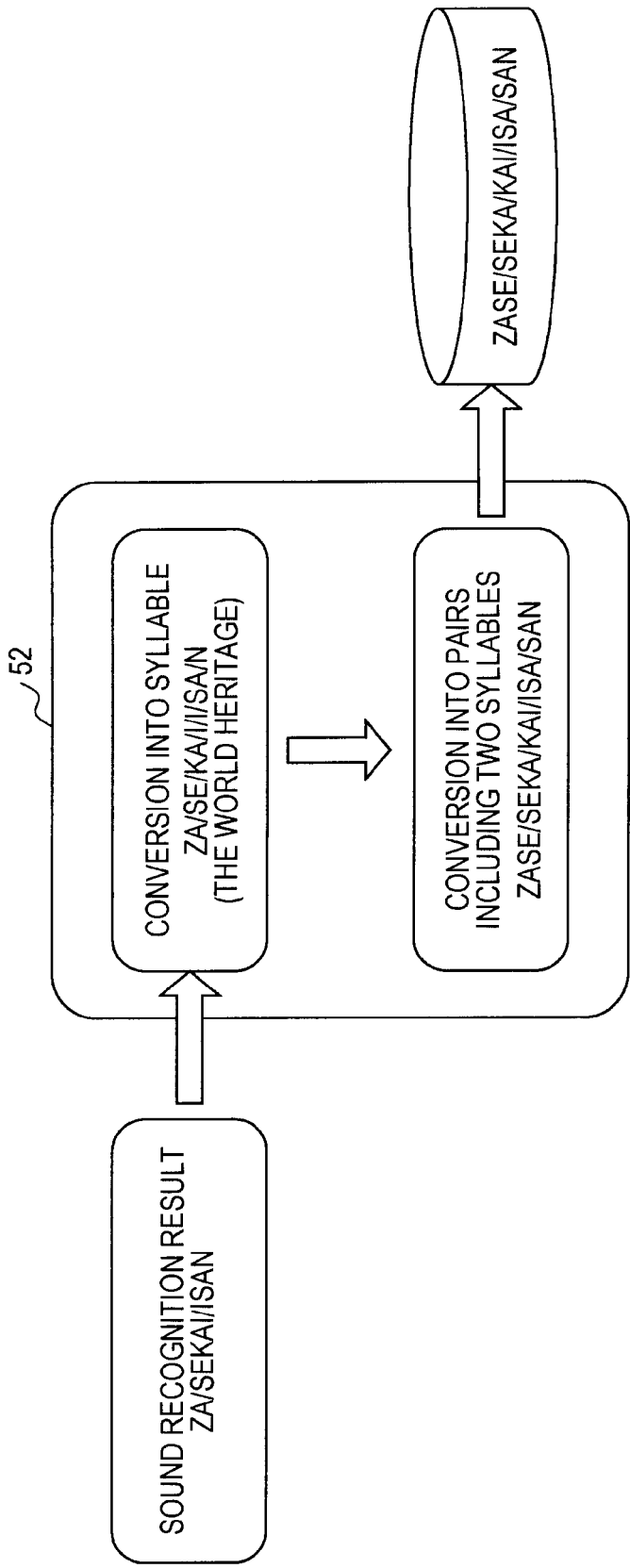
FIG. 4 is a diagram illustrating processing of a pronunciation symbol conversion unit when two-syllable concatenation is employed as a matching unit.

FIG. 4 is a diagram illustrating processing of the pronunciation symbol conversion unit 55 in FIG. 2 when two-syllable concatenation (sequential two syllables) is employed as a unit for matching by the matching unit 56 (FIG. 2).

(For example, a notation symbol of) the sound recognition result for input sound is supplied to the pronunciation symbol conversion unit 52 from the sound recognition unit 51.

The pronunciation symbol conversion unit 52 converts the sound recognition result supplied from the sound recognition unit 51 into the syllable sequence.

Moreover, the pronunciation symbol conversion unit 55 extracts two-syllable concatenation including two syllables of a syllable to which attention is being paid and a syllable immediately after the syllable to which attention is being paid while attention is paid to one syllable after another from the top of the syllable sequence in the search result target word string toward the end of the syllable sequence, and supplies the sequence of the two-syllable concatenation to the matching unit 56 (FIG. 2) as a recognition result pronunciation symbol string.

Figure 5:
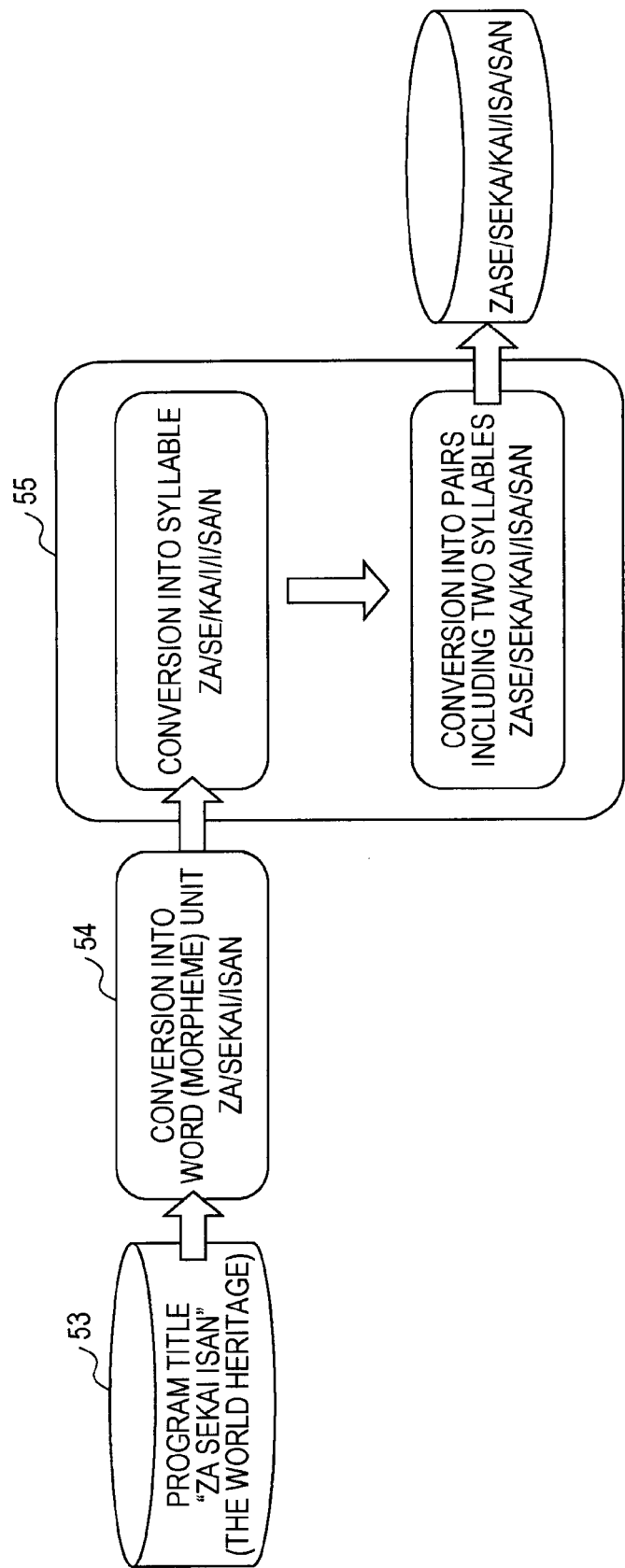
FIG. 5 is a diagram illustrating processing of a pronunciation symbol conversion unit when two-syllable concatenation is employed as a matching unit.

FIG. 5 is a diagram illustrating processing of the pronunciation symbol conversion unit 52 in FIG. 2 when two-syllable concatenation is employed as a unit for matching by the matching unit 56 (FIG. 2).

A program title or the like as a search result target word string stored in the search result target storage unit 53 is subjected to morpheme analysis by the morpheme analyzing unit 54 and then supplied to the pronunciation symbol conversion unit 55.

The pronunciation symbol conversion unit 55 converts the search result target word string supplied from the morpheme analyzing unit 54 into a syllable sequence.

Moreover, the pronunciation symbol conversion unit 55 extracts two-syllable concatenation including two syllables of a syllable to which attention is being paid and a syllable immediately after the syllable to which attention is being paid while attention is paid to one syllable after another from the top of the syllable sequence in the sound recognition result toward the end of the syllable sequence, and supplies the sequence of the two-syllable concatenation to the matching unit 56 (FIG. 2) as a search result target pronunciation symbol string.

When a cosine distance, for example, as a similarity degree between a recognition result pronunciation symbol string and a search result target pronunciation symbol string is obtained in matching between the recognition result pronunciation symbol string and the search result target pronunciation symbol string in units of two-syllable concatenation, the matching unit 56 obtains a recognition result vector which is a vector expressing the recognition result pronunciation symbol string based on the two-syllable concatenation constituting the recognition result pronunciation symbol string.

That is, the matching unit 56 obtains a vector expressing a component corresponding to a two-syllable concatenation which is present in the recognition result pronunciation symbol string with 1 and expressing a component corresponding to a two-syllable concatenation which is not present in the recognition result pronunciation symbol string with 0, for example, as a recognition result vector which expresses the recognition result pronunciation symbol string.

Moreover, the matching unit 56 obtains a search result target vector which is a vector expressing a search result target pronunciation symbol string based on the two-syllable concatenation constituting the search result target pronunciation symbol string of the search result target word string in the same manner for a program title or the like, for example, as each search result target word string stored in the search result target storage unit 53.

In addition, the matching unit 56 performs matching in units of two-syllable concatenations in order to obtain a cosine distance which is a value obtained by dividing an inner product between the recognition result vector and the search result target vector by a multiplied value between the size of the recognition result vector and the size of the search result target vector as a similarity degree between the sound recognition result and the search result target word string corresponding to the search result target vector.

Figure 6:
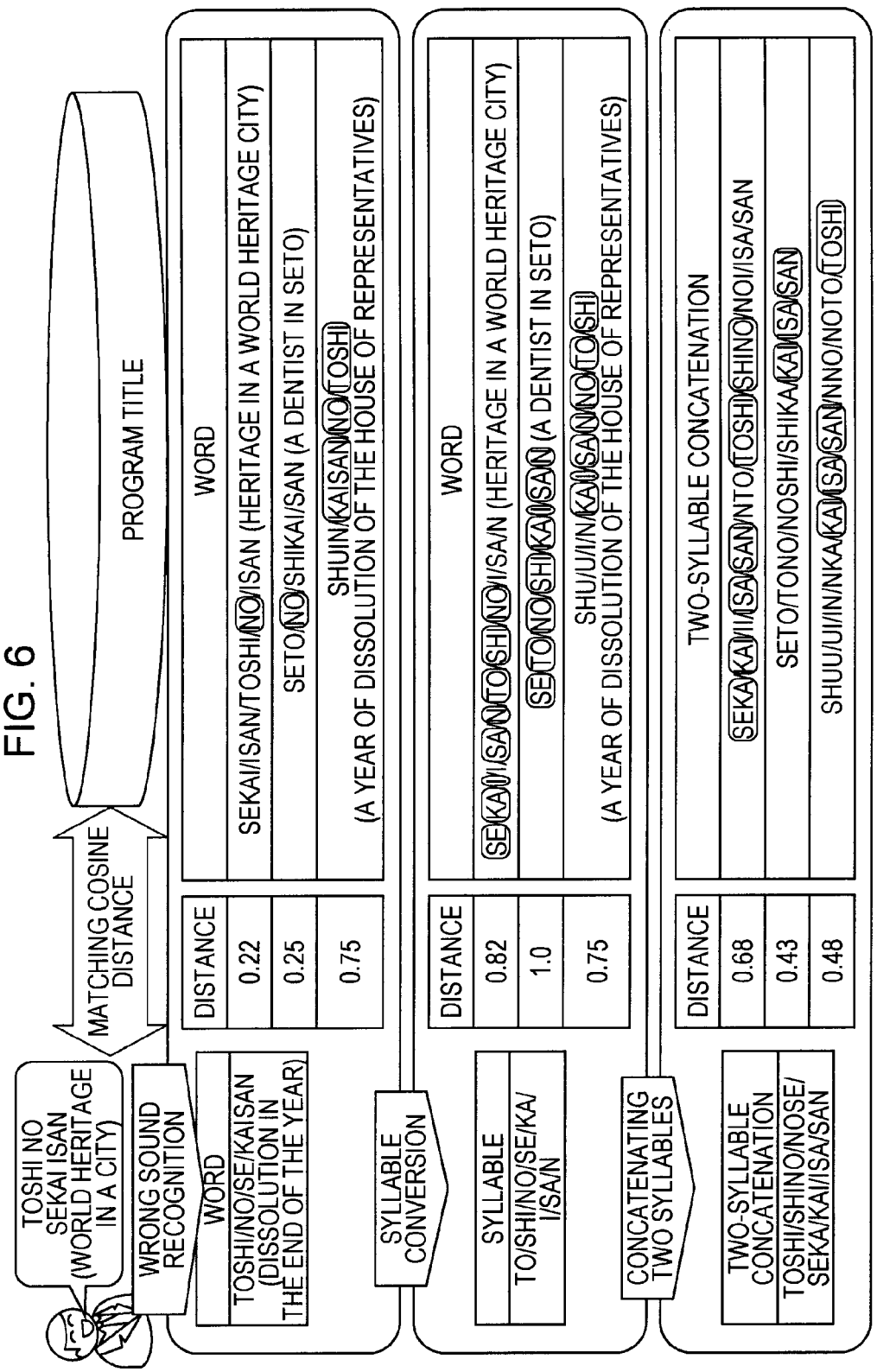
FIG. 6 is a diagram illustrating results of matching in units of words, matching in units of syllables, and matching in units of two-syllable concatenations.

FIG. 6 is a diagram illustrating results of matching in units of words, matching in units of (one) syllable, and matching in units of two-syllable concatenations.

In FIG. 6, a sound recognition result "TOSHI NO SE KAISAN (breaking up at the end of the year)" is erroneously obtained for the input sound "TOSHI NO SEKAI ISAN (world heritage in a city)" in the same manner as in FIG. 3, and three program titles including "SEKAI ISAN TOSHI NO ISAN (heritage in a world heritage city)", "SETO NO HAISHA SAN (a dentist in Seto)", and "SHUIN KAISAN NO TOSHI (a year in which dissolution of the house of representatives occurs)" are prepared as the search result target word strings.

In FIG. 6, matching in units of words with the use of notation symbols, matching in units of syllables with the use of pronunciation symbols, and matching in units of two-syllable concatenations with the use of pronunciation symbols are performed.

Moreover, a word or a pronunciation symbol in the search result target word string which coincides with a word or a pronunciation symbol (syllable) in the sound recognition result "TOSHI NO SE KAISAN (breaking up at the end of the year)" is circled in FIG. 6.

In matching in units of words, 0.22, 0.25, and 0.75 are respectively obtained as similarity degrees (cosine distances) between the sound recognition result "TOSHI NO SE KAISAN (breaking up at the end of the year)" and each of the search result target word strings "SEKAI ISAN TOSHI NO ISAN (heritage in a world heritage city)", "SETO NO HAISHA SAN (a dentist in Seto)", and "SHUIN KAISAN NO TOSHI (a year in which dissolution of the house of representatives occurs)".

Accordingly, if it is assumed that a search result target word string with the highest ranked similarity degree obtained as a result of matching is output as a search result word string, and even when the sound recognition for the input sound "TOSHI NO SEKAI ISAN (world heritage in a city)" is erroneously performed, and the sound recognition result "TOSHI NO SE KAISAN (breaking up at the end of the year)" is obtained, the search result target word string "SHUIN KAISAN NO TOSHI (a year in which dissolution of the house of representatives occurs)" with the highest ranked similarity degree of 0.75 with respect to the sound recognition result "TOSHI NO SE KAISAN (breaking up at the end of the year)" is obtained as the search result word string from among the three program titles including "SEKAI ISAN TOSHI NO ISAN (heritage in a world heritage city)", "SETO NO HAISHA SAN (a dentist in Seto)", and "SHUIN KAISAN NO TOSHI (a year in which dissolution of the house of representatives occurs)" as the search result target word strings in matching of units of words with the use of notation symbols.

It is appropriate to select the first program title "SEKAI ISAN TOSHI NO ISAN (heritage in a world heritage city)" in the aforementioned three program titles including "SEKAI ISAN TOSHI NO ISAN (heritage in a world heritage city)", "SETO NO HAISHA SAN (a dentist in Seto)", and "SHUIN KAISAN NO TOSHI (a year in which dissolution of the house of representatives occurs)" with respect to the input sound "TOSHI NO SEKAI ISAN (world heritage in a city)".

However, if the sound recognition for the input sound "TOSHI NO SEKAI ISAN (world heritage in a city)" is erroneously performed, and "TOSHI NO SE KAISAN (breaking up at the end of the year)" which has the same pronunciation (reading) and different notation is obtained, not the appropriate program title "SEKAI ISAN TOSHI NO ISAN (heritage in a world heritage city)" with respect to the input sound "TOSHI NO SEKAI ISAN (world heritage in a city)" but the program title "SHUIN KAISAN NO TOSHI (a year in which dissolution of the house of representatives occurs)" which has nothing to do with "TOSHI NO SEKAI ISAN (world heritage in a city)" is obtained as the search result word string in matching in units of words with the use of notation symbols.

In addition, the program title "SHUIN KAISAN NO TOSHI (a year in which dissolution of the house of representatives occurs)" which has nothing to do with the input sound "TOSHI NO SEKAI ISAN (world heritage in a city)" is obtained as the search result word string with respect to the sound recognition result "TOSHI NO SE KAISAN (breaking up at the end of the year)" which is erroneously obtained with respect to the input sound "TOSHI NO SEKAI ISAN (world heritage in a city)" as described with reference to FIG. 3 even when the matching with the use of notation symbols is performed not in units of words but in units of notation symbols.

In matching of units of syllables with the use of pronunciation symbols, 0.82, 1.0, and 0.75 are respectively obtained as the similarity degrees between the sound recognition result "TOSHI NO SE KAISAN (breaking up at the end of the year)" and each of the search result target word strings including "SEKAI ISAN TOSHI NO ISAN (heritage in a world heritage city)", "SETO NO HAISHA SAN (a dentist in Seto)", and "SHUIN KAISAN NO TOSHI (a year in which dissolution of the house of representatives occurs)".

Accordingly, for example, if it is assumed that a search result target word string with the highest similarity degree obtained as a result of matching is output as a search result word string, and even when the sound recognition for the input sound "TOSHI NO SEKAI ISAN (world heritage in a city)" is erroneously performed, and the sound recognition result "TOSHI NO SE KAISAN (breaking up at the end of the year)" is obtained, the search result target word string "SETO NO HAISHA SAN (a dentist in Seto)" with the highest ranked similarity degree of 1.0 with respect to the sound recognition result "TOSHI NO SE KAISAN (breaking up at the end of the year)" is obtained as the search result word string from among the three program titles including "SEKAI ISAN TOSHI NO ISAN (heritage in a world heritage city)", "SETO NO HAISHA SAN (a dentist in Seto)", and "SHUIN KAISAN NO TOSHI (a year in which dissolution of the house of representatives occurs)" as the search result target word strings in matching in units of syllables with the use of notation symbols.

That is, if the sound recognition for the input sound "TOSHI NO SEKAI ISAN (world heritage in a city)" is erroneously performed, and "TOSHI NO SE KAISAN (breaking up at the end of the year)" which has the same pronunciation and different notation is obtained, not the appropriate program title "SEKAI ISAN TOSHI NO ISAN (heritage in a world heritage city)" with respect to the input sound "TOSHI NO SEKAI ISAN (world heritage in a city)" but the program title "SETO NO HAISHA SAN (a dentist in Seto)" which has nothing to do with "TOSHI NO SEKAI ISAN (world heritage in a city)" is obtained as the search result word string in matching in units of syllables with the use of pronunciation symbols.

The value of the similarity degree of the program title "SEKAI ISAN TOSHI NO ISAN (heritage in a world heritage city)" which is appropriate for the input sound "TOSHI NO SEKAI ISAN (world heritage in a city)" is 0.22 which is the third highest ranked (the lowest ranked) among the three search result target word strings in matching in units of words with the use of notation symbols while the value of the similarity degree of the program title "TOSHI NO SEKAI ISAN (heritage in a world heritage city)" which is appropriate for the input sound "TOSHI NO SEKAI ISAN (world heritage in a city)" is 0.82 which is the second highest ranked among the three search result target word strings in matching in units of syllables with the use of pronunciation symbols.

Accordingly, it is possible to consider that matching in units of syllables with the use of pronunciation symbols is more effective than matching in units of words with the use of notation symbols since the similarity degree of the program title "SEKAI ISAN TOSHI NO ISAN (heritage in a world heritage city)" which is appropriate for the input sound "TOSHI NO SEKAI ISAN (world heritage in a city)" is higher ranked than that in the case of matching in units of words with the use of notation symbols.

In matching in units of two-syllable concatenations with the use of pronunciation symbols, 0.68, 0.43, and 0.48 are respectively obtained as the similarity degrees between the sound recognition result "TOSHI NO SE KAISAN (breaking up at the end of the year)" and each of the search result target word strings including "SEKAI ISAN TOSHI NO ISAN (heritage in a world heritage city)", "SETO NO HAISHA SAN (a dentist in Seto)", and "SHUIN KAISAN NO TOSHI (a year in which dissolution of the house of representatives occurs)".

Accordingly, if it is assumed that a search result target word string with the highest similarity degree obtained as a result of matching is output as a search result word string, and even when the sound recognition for the input sound "TOSHI NO SEKAI ISAN (world heritage in a city)" is erroneously performed, and the sound recognition result "TOSHI NO SE KAISAN (breaking up at the end of the year)" is obtained, the search result target word string with the highest ranked similarity degree of 0.68 with respect to the sound recognition result "TOSHI NO SE KAISAN (breaking up at the end of the year)", that is, the program title "SEKAI ISAN TOSHI NO ISAN (heritage in a world heritage city)" which is appropriate for the input sound "TOSHI NO SEKAI ISAN (world heritage in a city)" is obtained as the search result word string from among the three program titles including "SEKAI ISAN TOSHI NO ISAN (heritage in a world heritage city)", "SETO NO HAISHA SAN (a dentist in Seto)", and "SHUIN KAISAN NO TOSHI (a year in which dissolution of the house of representatives occurs)" as the search result target word strings in matching in units of two-syllable concatenations with the use of pronunciation symbols.

According to matching with the use of pronunciation symbols, it is possible to perform a search for a word string corresponding to input sound in a robust manner as compared with the case in which matching with the use of notation symbols is performed as described above.

That is, according to matching with the use of pronunciation symbols, it is possible to prevent (reduce) the cases in which a word string corresponding to input sound is not output as a search result word string even when sound recognition is erroneously performed.

Incidentally, when a cosine distance is employed as a similarity degree between (the recognition result pronunciation symbol string of) the sound recognition result and (the search result target pronunciation symbol string of) the search result target word string in the matching unit 56 (FIG. 1), a vector expressing a component corresponding to syllables (two-syllable concatenation) which is present in the recognition result pronunciation symbol string with 1 and expressing a component corresponding to a syllable which is not present in the recognition result pronunciation symbol string with 0 is obtained, for example, as the recognition result vector expressing the recognition result pronunciation symbol string as described above.

Furthermore, the matching unit 56 obtains the search result target vector expressing the search result target pronunciation symbol string of the search result target word string in the same manner.

Here, the component value of the recognition result vector is set to 1 or 0 in accordance with whether or not the syllable corresponding to the component is present in the recognition result pronunciation symbol string. However it is possible to employ tf (Term Frequency) which is the frequency at which the syllable corresponding to the component appears in the recognition result pronunciation symbol string, as the component value of the recognition result vector.

In addition, it is also possible to employ idf (Invert Document Frequency) which becomes a large value with respect to a syllable which frequently appears in specific search result target word strings and becomes a small value with respect to a syllable which uniformly appears in many search result target word strings and TF-IDF which considers both tf and idf, for example, as the component value of the recognition result vector.

The same is true for the search result target vector.

If it is assumed that $V_{UTR}$ represents a recognition result vector and $V_{TITLE}(i)$ represents a search result target vector of the i-th search result target word string stored in the search result target storage unit 53 (FIG. 1), the cosine distance D as a similarity degree between the sound recognition result and the i-th search result target word string is calculated based on Equation (1).

$$D = V_{UTR} \cdot V_{TITLE}(i)/(|V_{UTR}||V_{TITLE}(i)|) \qquad (1)$$

In Equation (1), · represents an inner product, and |x| represents the size (norm) of a vector x. Accordingly, the cosine distance D can be obtained by dividing an inner product $V_{UTR} \cdot V_{TITLE}(i)$ between the recognition result vector $V_{UTR}$ and the search result target vector $V_{TITLE}(i)$ by a multiplied value $|V_{UTR}||V_{TITLE}(i)|$ between the size $|V_{UTR}|$ of the recognition result vector $V_{UTR}$ and the size $|V_{TITLE}(i)|$ of the search result target vector $V_{TITLE}(i)$.

The cosine distance D ranges from 0.0 to 1.0. The larger the cosine distance value is, the higher the similarity degree between the recognition result pronunciation symbol string represented by the recognition result vector $V_{UTR}$ and the search result target pronunciation symbol string represented by the search result target vector $V_{TITLE}(i)$ becomes.

Since the cosine distance D can be obtained by dividing an inner product $V_{UTR} \cdot V_{TITLE}(i)$ between the recognition result vector $V_{UTR}$ and the search result target vector $V_{TITLE}(i)$ by a multiplied value between the size $|V_{UTR}|$ of the recognition result vector $V_{UTR}$ and the size $|V_{TITLE}(i)|$ of the search result target vector $V_{TITLE}(i)$, the difference between the lengths of the sound recognition result and the search result target word string affects the cosine distance D.

Here, the lengths of the sound recognition result and the search result target word string respectively mean the numbers of the notation symbols in the sound recognition results and in the search result target word strings when matching between the sound recognition result and the search result target word string, that is, the calculation of the cosine distance D as the similarity degree is performed in units of notation symbols with the use of notation symbols.

In addition, the lengths of the sound recognition result and the search result target word string respectively mean the numbers of the words in the sound recognition result and in the search result target word string when the calculation of the similarity degree is performed in units of words with the use of notation symbols.

Moreover, the lengths of the sound recognition result and the search result target word string respectively mean the numbers of syllables in the sound recognition result and in the search result target word string when the calculation of the similarity degree is performed in units of syllables with the use of pronunciation symbols.

Furthermore, the lengths of the sound recognition result and the search result target word string respectively mean the numbers of two-syllable concatenations in the sound recognition result and in the search result target word string when the calculation of the similarity degree is performed in units of two-syllable concatenations with the use of pronunciation symbols.

It is assumed that the calculation of cosine distance D as matching between the sound recognition result and the search result target word string is performed in units of words with the use of notation symbols in order to simplify explanation. Since the computation of the cosine distance D by Equation (1) as the similarity degree includes dividing by the size $|V_{TITLE}(i)|$ of the search result target vector $V_{TITLE}(i)$, a search result target word string with a short length (the number of words here) including the same word string as that in the sound recognition result is more likely to exhibit a higher similarity degree (the cosine distance D is longer) while a search result target word string with a long length including the same word string as that in the sound recognition result is more likely to exhibit a lower similarity degree (the cosine distance D is shorter) when the long search result target word string and the short search result target word string are compared.

Accordingly, precision in search for a word string corresponding to input sound is deteriorated in some cases since a similarity degree between a sound recognition result and a long search result target word string does not become the highest rank and such a search result target word string is not output as a search result word string even when a part of the long search result target word string is obtained as the sound recognition result.

That is, when a part of a long title is uttered, for example, the similarity degree of the long title does not become the highest rank, and the long title is not output as the search result word string.

For the same reason, when a long sound recognition result and a short sound recognition result, which include the same word string as a predetermined search result target word string, are compared, the similarity degree between the long sound recognition result and the predetermined search result target word string is likely to be lower while the similarity degree between the short sound recognition result and the predetermined search result target word string is likely to be higher.

Accordingly, precision in search for a word string corresponding to input sound is deteriorated in some cases since a similarity degree of the predetermined search result target word string does not become the highest ranked for the long sound recognition result which includes the same word string as the predetermined search result target word string and the predetermined search result target word string is not output as a search result word string.

That is, in the case of a long utterance including a short title, for example, the similarity degree of the short title does not become the highest ranked, and the short title is not output as a search result word string in some cases.

Thus, it is possible to employ a corrected distance obtained by correcting a cosine distance D as a similarity degree between a sound recognition result and a search result target word string so as to reduce the influence of the difference between the lengths of the sound recognition result and the search result target word string in the matching unit 56 (FIG. 2).

It is possible to prevent the aforementioned similarity degree between a sound recognition result and a long search result target word string and the similarity degree between a long sound recognition result and a search result target word string from being lowered, to perform a search for a word string corresponding to input sound as a result in a robust manner, and thereby to prevent the precision in search for a word string corresponding to input sound from being deteriorated when the corrected distance is employed as the similarity degree between the sound recognition result and the search result target word string.

The corrected distance includes a first corrected distance and a second corrected distance.

The first corrected distance is obtained using a value $|V_{UTR}| \times \sqrt{(|V_{TITLE}(i)|/|V_{UTR}|)}$ which is not proportional to the length of the search result target word string, that is, a square root $\sqrt{(|V_{TITLE}(i)||V_{UTR}|)}$ of a multiplied value between the size $|V_{UTR}|$ of the recognition result vector $V_{UTR}$ and the size $|V_{TITLE}(i)|$ of the search result target vector $V_{TITLE}(i)$ instead of the size $|V_{TITLE}(i)|$ of the search result target vector $V_{TITLE}(i)$ which is proportional to the length of the search result target word string in the computation of Equation (1) for obtaining the cosine distance D.

Here, the value to be used instead of the size $|V_{TITLE}(i)|$ of the search result target vector $V_{TITLE}(i)$ in the computation of Equation (1) for obtaining the cosine distance D is also referred to as a substitution size $S(i)$.

The first corrected distance D1 is obtained based on Equation (2).

$$D1 = V_{UTR} \cdot V_{TITLE}(i) / (|V_{UTR}|S(i))$$
$$= V_{UTR} \cdot V_{TITLE}(i) / (|V_{UTR}||V_{UTR}| \times \sqrt{|V_{TITLE}(i)|/|V_{UTR}|})$$
$$= V_{UTR} \cdot V_{TITLE}(i) / (|V_{UTR}|\sqrt{|V_{TITLE}(i)||V_{UTR}|}) \quad (2)$$

In Equation (2), the square root $\sqrt{(|V_{TITLE}(i)||V_{UTR}|)}$ of the multiplied value between the size $|V_{UTR}|$ of the recognition result vector $V_{UTR}$ and the size $|V_{TITLE}(i)|$ of the search result target vector $V_{TITLE}(i)$ is larger than $|V_{TITLE}(i)|$ when $|V_{TITLE}(i)|$ is small, that is, when the length of the search result target word string is short, and the square root $\sqrt{(|V_{TITLE}(i)||V_{UTR}|)}$ is smaller than $|_{TITLE}(i)|$ when $|V_{TITLE}(i)|$ is large, that is, when the length of the search result target word string is long.

As a result, the first corrected distance D1 obtained based on Equation (2) is a value which is less influenced by the difference in the size $|V_{TITLE}(i)|$ of the search result target vector $V_{TITLE}(i)$ as the length of the search result target word string with respect to the length of the sound recognition result, that is, a value obtained by reducing the influence of the difference between the lengths of the sound recognition result and the search result target word string as compared with the cosine distance D obtained based on Equation (1).

The second corrected distance is obtained using the size $|V_{UTR}|$ of the recognition result vector $V_{UTR}$ as the substitution size $S(i)$ instead of the size $|V_{TITLE}(i)|$ of the search result target vector $V_{TITLE}(i)$ which is proportional to the length of the search result target word string in the computation of Equation (1) for obtaining the cosine distance D.

Accordingly, the second corrected distance D2 is obtained based on Equation (3).

$$D2 = V_{UTR} \cdot V_{TITLE}(i)/(V_{UTR}|S(i))$$
$$= V_{UTR} \cdot V_{TITLE}(i)/|V_{UTR}|^2 \quad (3)$$

Since the second corrected distance D2 is obtained without using the size $|V_{TITLE}(i)|$ of the search result target vector $V_{TITLE}(i)$, the second corrected distance D2 is a value which is not influenced by the difference in the size $|V_{TITLE}(i)|$ of the search result target vector $V_{TITLE}(i)$ as the length of the search result target word string with respect to the length of the sound recognition result, that is, a value obtained by reducing (removing) the influence of the difference in the lengths of the sound recognition result and the search result target word string.

Figure 7:
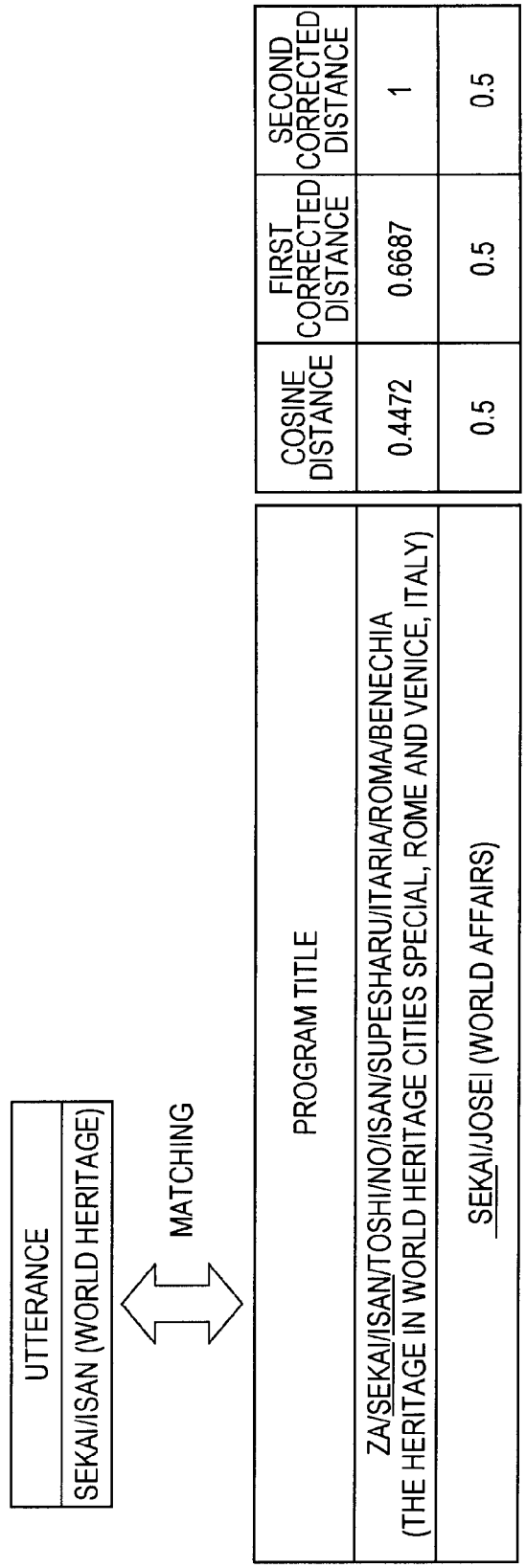
FIG. 7 is a diagram illustrating a matching simulation result when a cosine distance, a first corrected distance, and a second corrected distance are employed as similarity degrees between a sound recognition result and a search result target word string.

FIG. 7 is a diagram illustrating a matching simulation result when a cosine distance D, a first corrected distance D1, and a second corrected distance D2 are employed as similarity degrees between a sound recognition result and a search result target word string.

It was assumed that a correct sound recognition result "SEKAI ISAN (world heritage)" was obtained with respect to a short utterance "SEKAI ISAN (world heritage)" in the simulation in FIG. 7, and a long title "ZA SEKAI ISAN TOSHI NO ISAN SUPESHARU ITARIA ROMA BENECHIA (the heritage of world heritage cities special, Rome and Venice, Italy)" and a short title "SEKAI JOSEI (world affairs)" were employed as program titles as the search result target word strings.

Furthermore, matching was performed in units of words with the use of notation symbols.

In addition, underlinings are added to the words in the program titles as search result target word strings, which correspond to the words "SEKAI/ISAN (world/heritage)" in the sound recognition result "SEKAI ISAN (world heritage)" in FIG. 7.

Two words including "SEKAI (world)" and "ISAN (heritage)" in the title "ZA SEKAI ISAN TOSHI NO ISAN SUPESHARU ITARIA ROMA BENECHIA (the heritage of world heritage cities special, Rome and Venice, Italy)" coincide with the sound recognition result "SEKAI ISAN (world heritage)".

On the other hand, only one word "SEKAI (world)" in the title "SEKAI JOSEI (world affairs)" coincides with a part of the sound recognition result "SEKAI ISAN (world heritage)".

Accordingly, it is appropriate that the similarity degree of the title "ZA SEKAI ISAN TOSHI NO ISAN SUPESHARU ITARIA ROMA BENECHIA (the heritage of world heritage cities special, Rome and Venice, Italy)" including more words which coincide with the sound recognition result "SEKAI ISAN (world heritage)" is higher ranked than the similarity degree of the title "SEKAI JOSEI (world affairs)" between the title "ZA SEKAI ISAN TOSHI NO ISAN SUPESHARU ITARIA ROMA BENECHIA (the heritage of world heritage cities special, Rome and Venice, Italy)" and the title "SEKAI JOSEI (world affairs)".

However, when the cosine distance D is employed as the similarity degree, the similarity degree of the short title "SEKAI JOSEI (world affairs)" is 0.5 while the similarity degree of the long title "ZA SEKAI ISAN TOSHI NO ISAN SUPESHARU ITARIA ROMA BENECHIA (the heritage of world heritage cities special, Rome and Venice, Italy)" is 0.4472 with respect to the sound recognition result "SEKAI ISAN (world heritage)" which coincides with a part "SEKAI ISAN (world heritage)" of the long title "ZA SEKAI ISAN TOSHI NO ISAN SUPESHARU ITARIA ROMA BENECHIA (the heritage of world heritage cities special, Rome and Venice, Italy)", and the similarity degree of the short title "SEKAI JOSEI (world affairs)" becomes higher ranked than the similarity degree of the long title "ZA SEKAI ISAN TOSHI NO ISAN SUPESHARU ITARIA ROMA BENECHIA (the heritage of world heritage cities special, Rome and Venice, Italy)".

That is, when the cosine distance D is employed as the similarity degree, the long title "ZA SEKAI ISAN TOSHI NO ISAN SUPESHARU ITARIA ROMA BENECHIA (the heritage of world heritage cities special, Rome and Venice, Italy)" which is appropriate for the sound recognition result "SEKAI ISAN (world heritage)" does not become the higher rank due to the influence of the difference between the lengths of the short sound recognition result "SEKAI ISAN (world heritage)" which coincides with a part "SEKAI ISAN (world heritage)" of the long title "ZA SEKAI ISAN TOSHI NO ISAN SUPESHARU ITARIA ROMA BENECHIA (the heritage of world heritage cities special, Rome and Venice, Italy)" and the long title "ZA SEKAI ISAN TOSHI NO ISAN SUPESHARU ITARIA ROMA BENECHIA (the heritage of world heritage cities special, Rome and Venice, Italy)".

On the other hand, when the corrected distance is employed as the similarity degree, the similarity degree of the long title "ZA SEKAI ISAN TOSHI NO ISAN SUPESHARU ITARIA ROMA BENECHIA (the heritage of world heritage cities special, Rome and Venice, Italy)" is higher ranked than the similarity degree of the short title "SEKAI JOSEI (world affairs)".

That is, when the first corrected distance D1 is employed as the similarity degree, the similarity degree of the short title "SEKAI JOSEI (world affairs)" is 0.5 while the similarity degree of the long title "ZA SEKAI ISAN TOSHI NO ISAN SUPESHARU ITARIA ROMA BENECHIA (the heritage of world heritage cities special, Rome and Venice, Italy)" is 0.6687 with respect to the sound recognition result "SEKAI ISAN (world heritage)", and the similarity degree of the long title "ZA SEKAI ISAN TOSHI NO ISAN SUPESHARU ITARIA ROMA BENECHIA (the heritage of world heritage cities special, Rome and Venice, Italy)" is higher ranked than the similarity degree of the short title "SEKAI JOSEI (world affairs)"

In addition, when the second corrected distance D2 is employed as the similarity degree, the similarity degree of the short title "SEKAI JOSEI (world affairs)" is 0.5 while the similarity degree of the long title "ZA SEKAI ISAN TOSHI NO ISAN SUPESHARU ITARIA ROMA BENECHIA (the heritage of world heritage cities special, Rome and Venice, Italy)" is 1.0 with respect to the sound recognition result "SEKAI ISAN (world heritage)", and the similarity degree of the long title "ZA SEKAI ISAN TOSHI NO ISAN SUPESHARU ITARIA ROMA BENECHIA (the heritage of world heritage cities special, Rome and Venice, Italy)" is higher ranked than the similarity degree of the short title "SEKAI JOSEI (world affairs)".

When the corrected distance is employed as the similarity degree as described above, the influence of the difference between the lengths of the sound recognition result which coincides with a part of a long search result target word string and the long search result target word string is reduced, and the similarity degree of the long title "ZA SEKAI ISAN TOSHI NO ISAN SUPESHARU ITARIA ROMA BENECHIA (the heritage of world heritage cities special, Rome and Venice, Italy)" which is appropriate for the sound recognition result "SEKAI ISAN (world heritage)" becomes the highest ranked.

Figure 8:
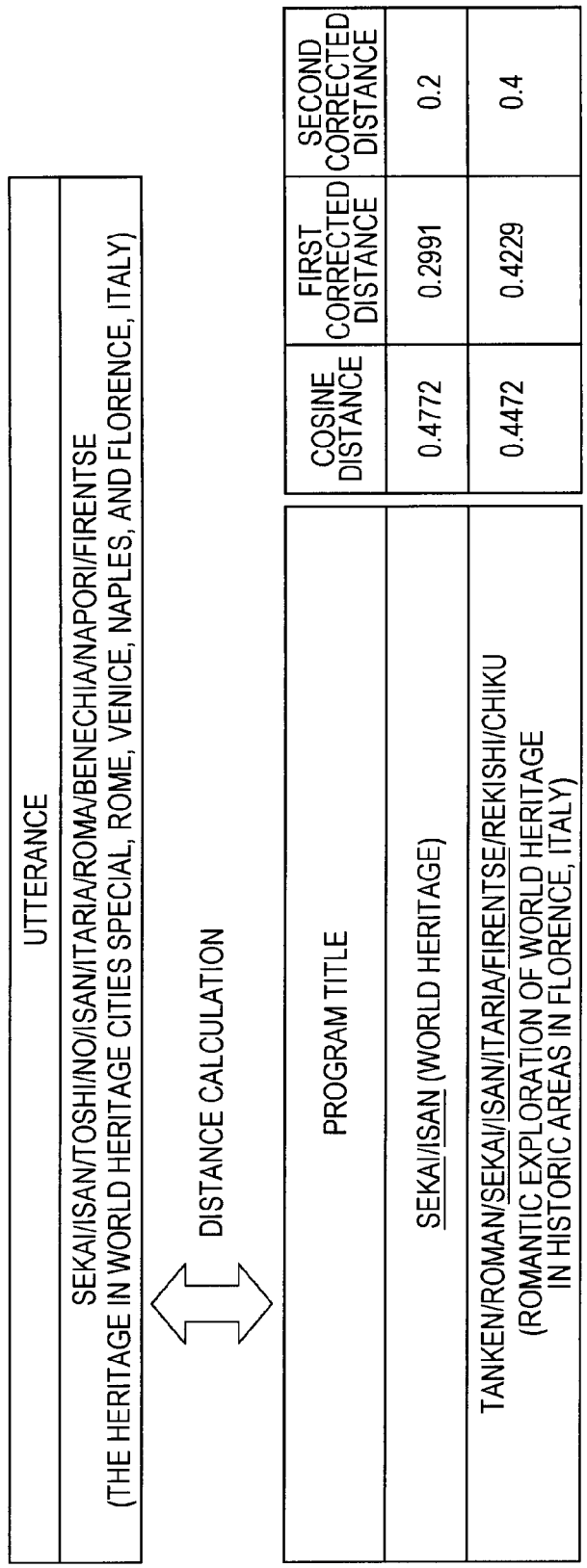
FIG. 8 is a diagram illustrating another matching simulation result when a cosine distance, a first corrected distance, and a second corrected distance are employed as similarity degree between a sound recognition result and a search result target word string.

FIG. 8 is a diagram illustrating another matching simulation result when a cosine distance D, a first corrected distance D1, and a second corrected distance D2 are employed as similarity degrees between a sound recognition result and a search result target word string.

In the simulation in FIG. 8, it was assumed that a correct sound recognition result "ZA SEKAI ISAN TOSHI NO ISAN SUPESHARU ITARIA ROMA BENECHIA (the heritage of world heritage cities special, Rome and Venice, Italy)" was obtained with respect to a long utterance "SEKAI ISAN TOSHI NO ISAN ITARIA ROMA BENECHIA NAPORI FIRENTSE (heritage of world heritage cities special, Rome, Venice, Naples, and Florence, Italy)", and a short title "SEKAI ISAN (world heritage)" and a long title "TANKEN ROMAN SEKAI ISAN ITARIA FIRENTSE REKISHI CHIKU (romantic exploration of world heritage in historic areas in Florence, Italy)" were employed as the program titles as the search result target word strings.

Moreover, matching was performed in units of words with the use of notation symbols.

In FIG. 8, underlinings are added to the words in the program titles as the search result target word strings, which coincide with the words "SEKAI/ISAN/TOSHI/NO/ISAN/ITARIA/ROMA/BENECHIA/NAPORI/FIRENTSE (world/heritage/cities/of/heritage/Italy/Rome/Venice/Naples/Florence)" in the sound recognition result "SEKAI ISAN TOSHI NO ISAN ITARIA ROMA BENECHIA NAPORI FIRENTSE (heritage of world heritage cities special, Rome, Venice, Naples, and Florence, Italy)".

Two words "SEKAI (world)" and "ISAN (heritage)" included in the title "SEKAI ISAN (world heritage)" coincide with parts of the sound recognition result "SEKAI ISAN TOSHI NO ISAN ITARIA ROMA BENECHIA NAPORI FIRENTSE (heritage of world heritage cities special, Rome, Venice, Naples, and Florence, Italy)".

On the other hand, four words "SEKAI (world)", "ISAN (heritage)", "ITARIA (Italy)" and "FIRENTSE (Florence)" included in the title "TANKEN ROMAN SEKAI ISAN ITARIA FIRENTSE REKISHI CHIKU (romantic exploration of world heritage in historic areas in Florence, Italy)" coincide with parts of the sound recognition result "SEKAI ISAN TOSHI NO ISAN ITARIA ROMA BENECHIA NAPORI FIRENTSE (heritage of world heritage cities special, Rome, Venice, Naples, and Florence, Italy)".

Accordingly, it is appropriate that the similarity degree of the title "TANKEN ROMAN SEKAI ISAN ITARIA FIRENTSE REKISHI CHIKU (romantic exploration of world heritage in historic areas in Florence, Italy)" including more words which coincide with parts of the sound recognition result "SEKAI ISAN TOSHI NO ISAN ITARIA ROMA BENECHIA NAPORI FIRENTSE (heritage of world heritage cities special, Rome, Venice, Naples, and Florence, Italy)" is higher ranked than the similarity degree of the title "SEKAI ISAN (world heritage)" between the title "SEKAI ISAN (world heritage)" and the "TANKEN ROMAN SEKAI ISAN ITARIA FIRENTSE REKISHI CHIKU (romantic exploration of world heritage in historic areas in Florence, Italy)".

However, when the cosine distance D is employed as the similarity degree, the similarity degree of the long title "TANKEN ROMAN SEKAI ISAN ITARIA FIRENTSE REKISHI CHIKU (romantic exploration of world heritage in historic areas in Florence, Italy)" is 0.4472 while the similarity degree of the short title "SEKAI ISAN (world heritage)" is 0.4772 with respect to the long sound recognition result "SEKAI ISAN TOSHI NO ISAN ITARIA ROMA BENECHIA NAPORI FIRENTSE (heritage of world heritage cities special, Rome, Venice, Naples, and Florence, Italy)", and the similarity degree of the long title "TANKEN ROMAN SEKAI ISAN ITARIA FIRENTSE REKISHI CHIKU (romantic exploration of world heritage in historic areas in Florence, Italy)" is not higher ranked than the similarity degree of the short title "SEKAI ISAN (world heritage)".

That is, when the cosine distance D is employed as the similarity degree, the similarity degree of the long title "TANKEN ROMAN SEKAI ISAN ITARIA FIRENTSE REKISHI CHIKU (romantic exploration of world heritage in historic areas in Florence, Italy)" which is appropriate for the sound recognition result "SEKAI ISAN TOSHI NO ISAN ITARIA ROMA BENECHIA NAPORI FIRENTSE (heritage of world heritage cities special, Rome, Venice, Naples, and Florence, Italy)" does not become the higher ranked due to the influence of the difference between the lengths of the long sound recognition result "SEKAI ISAN TOSHI NO ISAN ITARIA ROMA BENECHIA NAPORI FIRENTSE (heritage of world heritage cities special, Rome, Venice, Naples, and Florence, Italy)" and the short search result target word string "SEKAI ISAN (world heritage)".

On the other hand, when the corrected distance is employed as the similarity degree, the similarity degree of the long title "TANKEN ROMAN SEKAI ISAN ITARIA FIRENTSE REKISHI CHIKU (romantic exploration of world heritage in historic areas in Florence, Italy)" is higher ranked than the similarity degree of the short title "SEKAI ISAN (world heritage)".

That is, when the first corrected distance D1 is employed as the similarity degree, the similarity degree of the long title "TANKEN ROMAN SEKAI ISAN ITARIA FIRENTSE REKISHI CHIKU (romantic exploration of world heritage in historic areas in Florence, Italy)" is 0.4229 while the similarity degree of the short title "SEKAI ISAN (world heritage)" is 0.2991 with respect to the long sound recognition result "SEKAI ISAN TOSHI NO ISAN ITARIA ROMA BENECHIA NAPORI FIRENTSE (heritage of world heritage cities special, Rome, Venice, Naples, and Florence, Italy)", and the similarity degree of the long title "TANKEN ROMAN SEKAI ISAN ITARIA FIRENTSE REKISHI CHIKU (romantic exploration of world heritage in historic areas in Florence, Italy)" is higher ranked than the similarity degree of the short title "SEKAI ISAN (world heritage)".

In addition, when the second corrected distance D2 is employed as the similarity degree, the similarity degree of the long title "TANKEN ROMAN SEKAI ISAN ITARIA FIRENTSE REKISHI CHIKU (romantic exploration of world heritage in historic areas in Florence, Italy)" is 0.4 while the similarity degree of the short title "SEKAI ISAN (world heritage)" is 0.2 with respect to the long sound recognition result "SEKAI ISAN TOSHI NO ISAN ITARIA ROMA BENECHIA NAPORI FIRENTSE (heritage of world heritage cities special, Rome, Venice, Naples, and Florence, Italy)", and the similarity degree of the long title "TANKEN ROMAN SEKAI ISAN ITARIA FIRENTSE REKISHI CHIKU (romantic exploration of world heritage in historic areas in Florence, Italy)" is higher ranked than the similarity degree of the short title "SEKAI ISAN (world heritage)".

When the corrected distance is employed as the similarity degree as described above, the influence of the difference between the lengths of the long sound recognition result and the short search result target word string is reduced, and the similarity degree of the long title "TANKEN ROMAN SEKAI ISAN ITARIA FIRENTSE REKISHI CHIKU (romantic exploration of world heritage in historic areas in Florence, Italy)" which is appropriate for the sound recognition result "SEKAI ISAN TOSHI NO ISAN ITARIA ROMA BENECHIA NAPORI FIRENTSE (heritage of world heritage cities special, Rome, Venice, Naples, and Florence, Italy)" becomes the highest ranked.

Therefore, according to the corrected distance, it is possible to perform a search for a word string corresponding to input sound in a robust manner by reducing influence of the difference between the lengths of the sound recognition result and the search result target word string, and thereby preventing the precision in search for a word string corresponding to input sound from being deteriorated.

FIG. 9 is a diagram illustrating search result target vectors and vector substitution information.

Here, it is necessary to perform matching at a high speed, for example, in order to quickly output a search result word string in the sound search apparatus 10 (FIG. 2).

On the other hand, although it is necessary to prepare the search result target vector representing the search result target pronunciation symbol string and the recognition result vector representing the recognition result pronunciation symbol string when the cosine distance and the corrected distance as the similarity degrees are obtained in matching between the sound recognition result and the search result target word string, it takes time to perform matching, and matching at a high speed is prevented, if the search result target word string stored in the search result target storage unit 53 (FIG. 1) is converted into the search result target vector every time the sound recognition result is obtained.

Thus, there is a method by which matching is performed at a high speed by obtaining in advance the search result target vectors which are necessary for the similarity degree calculation based on the search result target word strings stored in the search result target storage unit 53 (FIG. 1) and storing the obtained search result target vectors in a memory, which is not shown in the drawing, incorporated in the matching unit 56.

In order to cause the memory incorporated in the matching unit 56 to store the search result target vectors, however, it is necessary for the memory to have a huge capacity.

That is, if it is assumed that a component value of a search result target vector is set to 1 or 0 depending on whether or not the syllable corresponding to the component is present in the search result target pronunciation symbol string, the search result target vector becomes a C-dimensional vector when the number of kinds of the pronunciation symbols is C.

For example, when symbol which represent Japanese syllables are employed as pronunciation symbols, the number C of kinds of the pronunciation symbols is about 100 to 300.

Moreover, even if the number C of kinds of the pronunciation symbols is 100, the search result target vector is a 10000 (=100×100)-dimensional vector when the two-syllable concatenation is employed as a unit for matching.

In addition, if the search result target vector is a D-dimensional vector, and the number of the search result target word string stored in the search result target storage unit 53 (FIG. 1) is Z, it is necessary for the memory incorporated in the matching unit 56 to have a storage capacity capable of storing D×Z components (of the search result target vectors).

Incidentally, the search result target vectors are generally sparse vectors, that is, the vectors in which most components are 0.

Thus, the matching unit 56 stores in the incorporate memory only (the ID (Identification) specifying) a pronunciation symbol of a syllable corresponding to a component which is not 0 in the search result target vector (a pronunciation symbol string for two-syllable concatenation corresponding to a component which is not 0 when two-syllable concatenation is employed as a unit for matching) for each search result target vector.

In addition, when frequency (tf) at which a syllable corresponding to a component appears in a search result target pronunciation symbol string is employed, for example, as a component value of a search result target vector, only a pair including (ID specifying) a syllable corresponding to a component which is not 0 in a search result target vector and frequency at which the syllable appears (a component value of the search result target vector) is stored in the memory incorporated in the matching unit 56.

When only a pronunciation symbol of a syllable corresponding to a component which is not 0 in a search result target vector is stored in the memory incorporated in the matching unit 56, the memory incorporated in the matching unit 56 is applicable as long as the memory has a storage capacity capable of storing K(1)+K(2)+ . . . K(Z) pronunciation symbols if it is assumed that the number of components, which are not 0, in the search result target vector of the i-th search result target word string is K(i).

Here, while a component value of a search result target vector is one of two values including 0 and 1, the value of the pronunciation symbol is one of about 100 to 300 values as described above. Therefore, while one component of the search result target vector can be expressed by 1 bit, it is necessary to prepare about 7 to 9 bits to express the pronunciation symbols.

However, since most components of the search result target vector are 0, the number K(i) of the components, which are not 0, of the search result target vector is small. Therefore, the storage capacity capable of storing K(1)+K(2)+ . . . K(Z) pronunciation symbols is smaller than the storage capacity capable of storing D×Z components (of the search result target vector).

Accordingly, it is possible to reduce the storage capacity necessary for the memory by storing in the memory incorporated in the matching unit 56 only the pronunciation symbols of the syllables corresponding to the components which are not 0 in the search result target vector for each search result target vector, as compared with the case in which the search result target vectors themselves are stored.

Hereinafter, a pronunciation symbol of a syllable corresponding to a component which is not 0 in a search result target vector stored in the memory incorporated in the matching unit 56 is arbitrarily referred to as vector substitution information since the pronunciation symbol is information instead of the search result target vector.

FIG. 9 is a diagram illustrating search result target vectors and vector substitution information to be used in stead of the search result target vectors.

A component value of the search result target vectors is 1 or 0 depending on whether a syllable corresponding to the component is present in the search result target pronunciation symbol string.

On the other hand, the vector substitution information instead of the search result target vector includes only the pronunciation symbols of syllables corresponding to the components which are not 0 in the search result target vectors.

Here, in the vector substitution information in FIG. 9, the pronunciation symbols of the same syllables which appear plural times in the search result target word string (the search result target pronunciation symbol string) are distinguished from each other by adding parenthetic numbers.

That is, in FIG. 9, the pronunciation symbols of the same syllables "I" appear twice in the search result target word string "SEKAI ISAN (world heritage)", for example. In the vector substitution information, the first pronunciation symbol is expressed by "I", and the second pronunciation symbol is expressed by "I(2)" by adding a parenthetic number "(2)" among the pronunciation symbols of the syllable "I" which appears twice, and thereby the pronunciation symbol "I" which appears twice are distinguished from each other.

In addition, it is also possible to express the pronunciation symbols of the same syllable, which appear plural times in a search result target word string without distinguishing from each other in the vector substitution information.

That is, in FIG. 9, the pronunciation symbols of the same syllable "I", which appear twice in the search result target word string "SEKAI ISAN (world heritage)" can be expressed by a pair (I, 2) including (an ID specifying) the syllable "I" and the frequency at which the syllable "I" appears in the vector substitution information, for example.

Since it is not necessary to perform access (reading of component of 0 from the memory) to the component of 0 in the search result target vector, which is necessary to be performed when the search result target vectors are stored, in matching, it is possible not only to reduce the storage capacity of the memory but also to increase the speed for matching when the vector substitution information is stored instead of the search result target vectors in the memory incorporated in the matching unit 56 as described above.

FIG. 10 is a diagram illustrating calculation of a similarity degree between a sound recognition result and a search result target word string when vector substitution information is stored instead of search result target vectors in the memory incorporated in the matching unit 56.

In FIG. 10, the pronunciation symbols of the same syllable, which appear plural times in the search result target word string, are expressed while being distinguished from each other in the vector substitution information as in the same manner in FIG. 9.

In FIG. 10, (the recognition result pronunciation symbol string of) the sound recognition result is also expressed by the vector substitution information instead of the recognition result vector in the same manner as (the search result target pronunciation symbol string of) the search result target word string which is expressed by the vector substitution information instead of the search result target vector.

When a cosine distance and a corrected distance are obtained as the similarity degrees between the sound recognition result and the search result target word string, it is necessary to prepare the inner product $V_{UTR} V_{TITLE}(i)$ between the recognition result vector $V_{UTR}$ and the search result target vector $V_{TITLE}(i)$ and the size $|V_{UTR}|$ of the recognition result vector $V_{UTR}$.

In addition, when the cosine distance and the first corrected distance among the corrected distances are obtained, it is necessary to further prepare the size $|V_{TITLE}(i)|$ of the search result target vector $V_{TITLE}(i)$.

It is possible to obtain the size $|V_{UTR}|$ of the recognition result vector $V_{UTR}$ by calculation of the square root of a sum of the number of the pronunciation symbols as components constituting the vector substitution information of the sound recognition result.

It is possible to obtain the size $|V_{TITLE}(i)|$ of the search result target vector $V_{TITLE}(i)$ with the use of the vector substitution information of the search result target word string in the same manner as that for the size $|V_{UTR}|$ of the recognition result vector $V_{UTR}$.

In addition, it is possible to obtain the inner product $V_{UTR} V_{TITLE}(i)$ between the recognition result vector $V_{UTR}$ and the search result target vector V TITLE (i) by setting the initial value of the inner product $V_{UTR} V_{TITLE}(i)$ to 0, sequentially paying attention to each pronunciation symbol constituting the vector substitution information of the sound recognition result, and incrementing the inner product $V_{UTR} V_{TITLE}(i)$ by 1 when there is a pronunciation symbol which coincides with the symbol, to which the attention is being paid, from among the vector substitution information of the search result target word string.

Accordingly, the cosine distance and the corrected distance as the similarity degrees between the sound recognition result and the search result target word string can be obtained using the vector substitution information of the sound recognition result and the search result target word string.

[Processing of Sound Search Apparatus 10]

Figure 11:
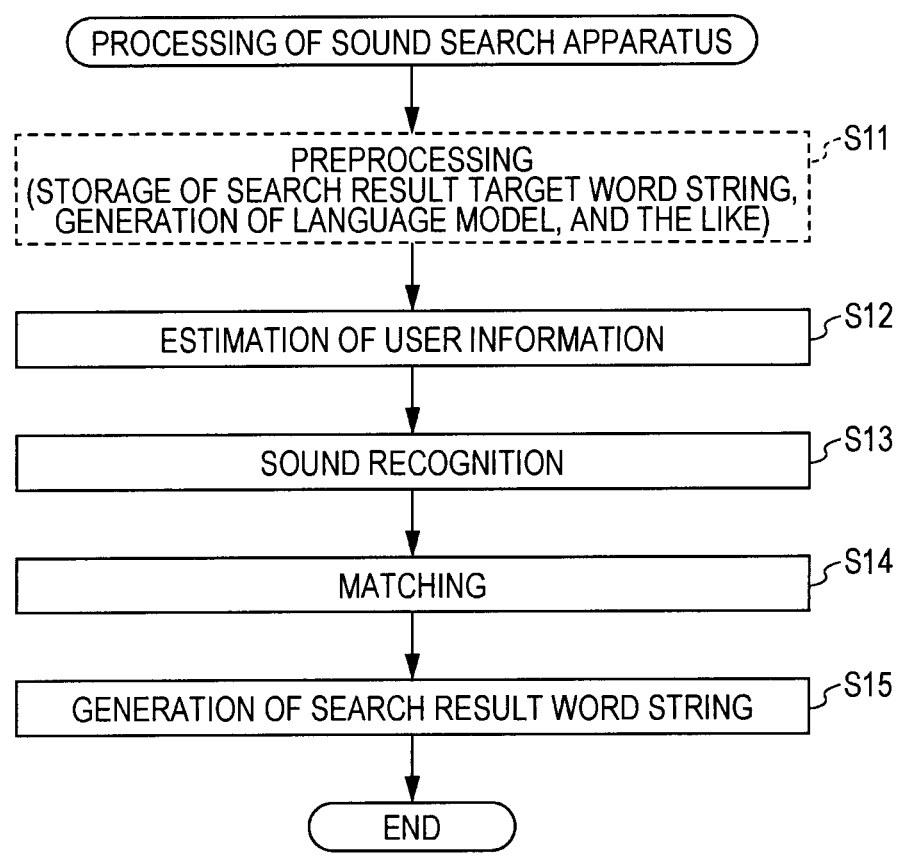
FIG. 11 is a flow chart illustrating processing of a sound search apparatus.

FIG. 11 is a flow chart illustrating processing (sound search processing) of a sound search apparatus 10 in FIG. 1.

In Step S11, the sound search apparatus 10 performs necessary preprocessing.

That is, the sound search apparatus 10 performs processing which can be performed before the input sound is supplied such as reading of a program title, names of performers, detailed information, and the like which are constituents constituting the EPG stored in the storing medium 23 and supplying the read title, names of performers, detailed information, and the like to the search result target storage unit 53 and cause the search result target storage unit 53 to store them as the search result target word strings.

In addition, the preprocessing in Step S11 is performed at a predetermined time every day, for example. Alternatively, the preprocessing in Step S11 is performed when the video-recorded program which has been video-recorded in the storing medium 23 is changed, when the EPG stored in the storing medium 23 is changed (updated), or the like.

When a user makes utterance after the last preprocessing, and the input sound as the utterance is supplied to the sound recognition unit 51 and the user information setting unit 58, the user information estimation unit 58 estimates one or both of nonverbal information and paralinguistic information from the input sound supplied thereto and supplies (outputs) the estimation result (nonverbal information, paralinguistic information) as user information to the matching unit 56 and the generation unit 57 in Step S12.

Then, the sound recognition unit 51 recognizes the input sound supplied thereto in Step S13.

The sound recognition result which can be obtained by performing sound recognition on the input sound by the sound recognition unit 51 is converted into the recognition result pronunciation symbol string through the pronunciation symbol conversion unit 52 and supplied to the matching unit 56.

In addition, the search result target word string stored in the search result target storage unit 53 is converted into the search result target pronunciation symbol string through the morpheme analyzing unit 54 and the pronunciation symbol conversion unit 55 and supplied to the matching unit 56.

In Step S14, the matching unit 56 performs matching between the recognition result pronunciation symbol string supplied from the sound recognition unit 51 through the pronunciation symbol conversion unit 52 and the search result target pronunciation symbol string supplied from the search result target storage unit 53 through the morpheme analyzing unit 54 and the pronunciation symbol conversion unit 55 for each of all the search result target word strings stored in the search result target storage unit 53, and supplies the matching result to the generation unit 57.

That is, the matching unit 56 calculates a cosine distance, a corrected distance, or the like as a similarity degree between each search result target word string stored in the search result target storage unit 53 and the sound recognition result, and supplies the similarity degree as matching result to the generation unit 57.

The generation unit 57 generates search result word strings based on the matching result from the matching unit 56 in Step S15, and the sound search apparatus 10 completes the sound search processing.

That is, the generation unit 57 selects the search result target word strings with the highest ranked N similarity degrees with respect to the sound recognition result as the search result word strings from among the search result target word strings stored in the search result target storage unit 53.

Then, the search result word string obtained by the generation unit 57 is supplied to the output I/F 33 (FIG. 1).

In addition, when the search result target word string is a program title, names of performers, or detailed information, for example, (or detailed information) other than a title is present in the search result target word strings with the highest ranked N similarity degrees with respect to the sound recognition result, the generation unit 57 can select as the search result target word string the program title including the names of performers as metadata along with or instead of the names of performers.

Here, when the operation mode of the sound search apparatus 10 is set to a normal mode, the matching unit 56 and the generation unit 57 respectively perform the aforementioned matching processing (matching processing in the normal mode) and the processing of generating the search result word string (processing of generating the search result word string in the normal mode) without using the user information supplied from the user information estimation unit 58.

On the other hand, when the operation mode is set to a relevant word usage matching mode or a weighting matching mode, the matching unit 56 performs matching processing with the use of the user information supplied from the user information estimation unit 58.

In addition, when the operation mode is set to the relevant word usage sorting mode, the generation unit 57 performs the processing of generating the search result word string with the use of the user information supplied from the user information estimation unit 58 as will be described later.

The matching processing in the relevant word usage matching mode, the matching processing in the weighting matching mode, and the processing of generating the search result word string in the relevant word usage sorting mode will be described later.

As for Steps S12 and S13, although the description was made of FIG. 11 in which the processing in Step S13 was performed after the processing in Step S12, the processing in Step S13 may be performed prior to the processing in Step S12, or the processing in Steps S12 and S13 may be performed at the same time (in a parallel manner).

[User Information Estimation by User Information Estimation Unit 58]

Figure 12:
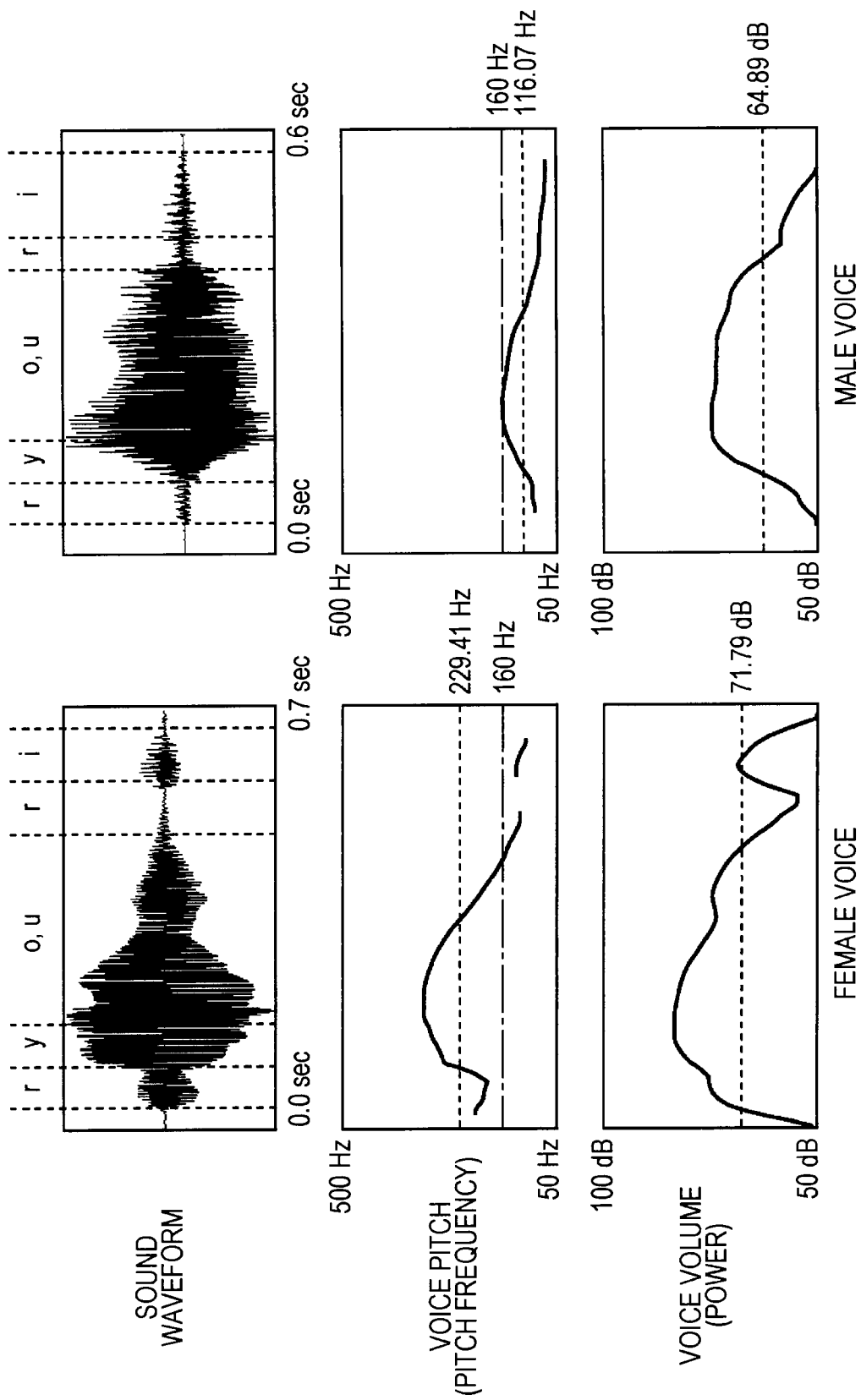
FIG. 12 is a diagram illustrating user information estimation processing by a user information estimation unit.

FIG. 12 is a diagram illustrating user information estimation processing by the user information estimation unit 58 in FIG. 1.

Here, the user information includes the nonverbal information and the paralinguistic information as described above.

In the user information estimation unit 58, the nonverbal information extracting unit 58A extracts (estimates) nonverbal information which is the information relating to the physical properties including the sex of the user (speaker) who uttered the input sound, the age group of the user who uttered the input sound (for example, the information regarding whether the user is a child or an adult), the information specifying which user the user who uttered the input sound corresponds to (for example, a user name, an ID specifying a user, and the like), and the like based on the pitch detection of the user input sound, the speaker specification using user input sound, and the like, for example.

FIG. 12 is a diagram illustrating a method of estimating the sex of the user who uttered the input sound as the nonverbal information (and thus the user information) by the nonverbal information extracting unit 58A.

That is, FIG. 12 shows waveforms, pitch, and power of the input sound (female voice) "RYORI (cooking)" which was generated by a female and the input sound (male voice) "RYORI (cooking)" which was generated by a man.

Since the pitch (frequency) of the female voice is averagely higher than that of the male voice, the nonverbal information extracting unit 58A estimates the sex of the user who uttered the input sound based on such pitch, for example.

That is, in FIG. 12, the maximum frequency of the pitch of the female voice "RYORI (cooking)" is twice (one octave) as high or more as the maximum frequency of the pitch of the male voice "RYORI (cooking)", and the pitch of the female voice "RYORI (cooking)" is averagely higher than that of the male voice "RYORI (cooking)".

Thus, the nonverbal information extracting unit 58A detects the pitch of the input sound and obtains an average pitch which is an average value of the pitch (in a sound section) of the input sound. In addition, the nonverbal information extracting unit 58A estimates the sex of the user who uttered the input sound based on the magnitude relationship between the average pitch of the input sound and a threshold value for the sex set in advance for estimating the sex.

Specifically, the nonverbal information extracting unit 58A estimates that the sex of the user who uttered the input sound is a female if the average pitch of the input sound is equal to or greater than (or exceeds) the threshold value for the sex.

In addition, the nonverbal information extracting unit 58A estimates that the sex of the user who uttered the input sound is a male if the average pitch of the input sound is not equal to or greater than the threshold value for the sex.

In FIG. 12, 160 Hz is set as the threshold vale for the sex. In addition, in FIG. 12, the average pitch of the female voice "RYORI (cooking)" is 229.41 Hz, and the average pitch of the male voice "RYORI (cooking)" is 116.07 Hz.

Accordingly, in FIG. 12, the sex of the user of the female voice "RYORI (cooking)" is estimated to be a female, and the sex of the user of the male voice "RYORI (cooking)" is estimated to be a male.

In addition, the nonverbal information extracting unit 58A can also extract prosodic information including pitch, power, intonation, and the such as that from the input sound, for example, and perform speaker specification (user identification) for obtaining information specifying which user the user who uttered the input sound corresponds to (for example, a name of a user, an ID for specifying a user, and the like) with the use of the prosodic information.

When the nonverbal information extracting unit 58A estimates the user who uttered the input sound and performs speaker specification for obtaining the information for specifying the user (hereinafter, also referred to as user specifying information) as described above, it is possible to create and store in advance in a recorder a table (hereinafter, also referred to as a user table) in which the user specifying information estimated (obtained) in the speaker specification, preference or action history (for example, titles or a category of programs which is frequently viewed or video-recorded by the user, the operation history of the operation unit 31 (FIG. 1), and the like) of the user specified by the user specifying information, and the information relating to the sex, age, and the like of the user.

In this case, the nonverbal information extracting unit 58A can perform speaker specification, refer to the information, which is associated to the user specifying information obtained as a result of the speaker specification, in the user table, and estimate the sex of the user who uttered the input sound.

In addition, when the nonverbal information extracting unit 58A estimates the user based on the speaker specification, it is possible to supply the user specifying information specifying the user as the nonverbal information and thus the user information from the user information estimation unit 58 to the matching unit 56 and the generation unit 57.

Here, the nonverbal information extracting unit 58A can estimate the age group of the user (for example, the user is estimated to be a child when the average pitch of the input sound is higher than a predetermined value, and the user is estimated to be an adult when the average pitch of the input sound is equal to or lower than the predetermined value) based on the tone of the average pitch of the input sound in addition to the sex of the user who uttered the input sound and the user specifying information, and supply the age group of the user as the nonverbal information and thus the user information to the matching unit 56 and the generation unit 57.

Figure 13:
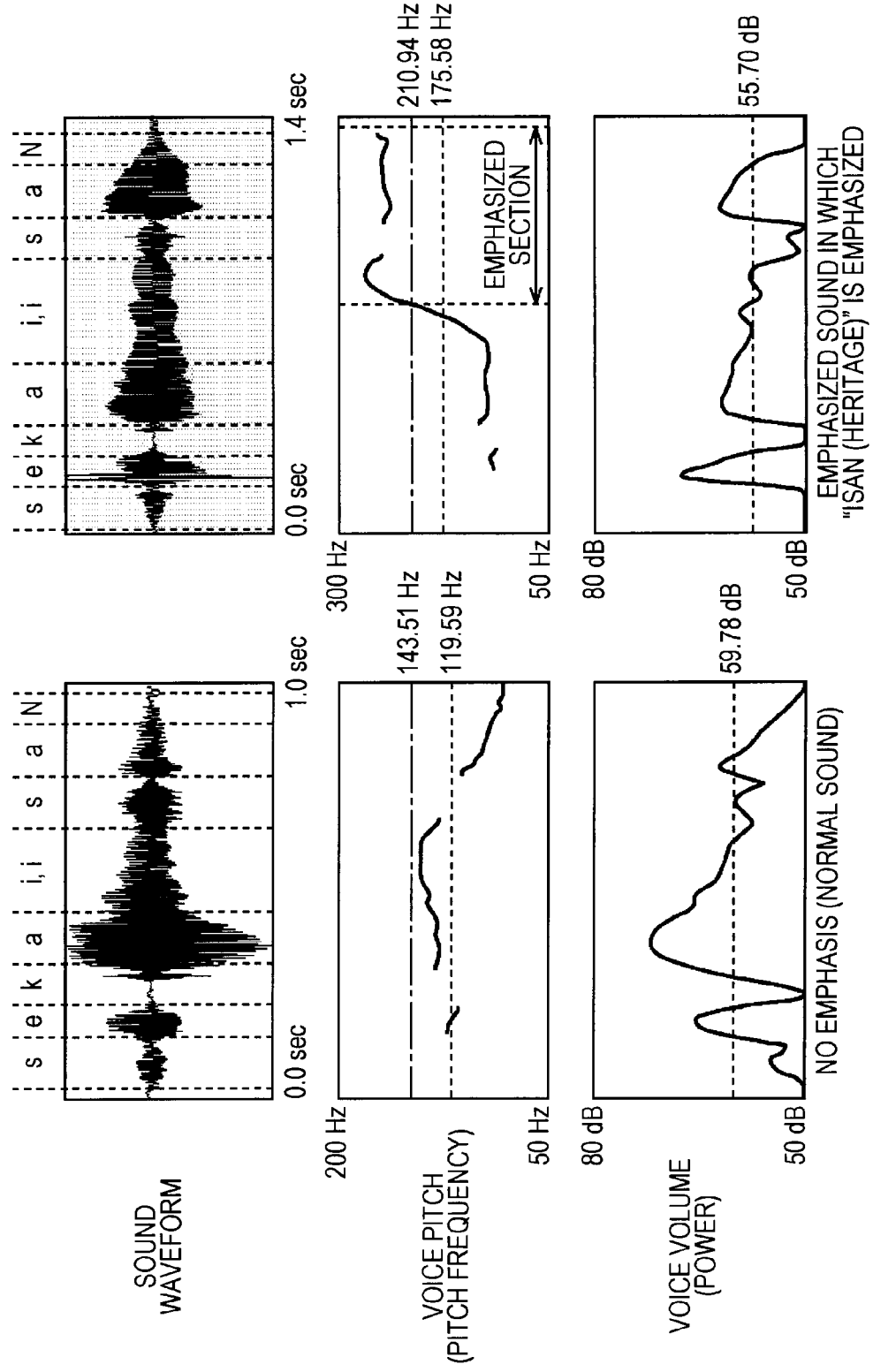
FIG. 13 is a diagram illustrating user information estimation processing by a user information estimation unit.

FIG. 13 is a diagram illustrating user information estimation processing by the user information estimation unit 58 in FIG. 1.

Here, the user information includes the nonverbal information and the paralinguistic information as described above.

In the user information estimation unit 58, the paralinguistic information extracting unit 58B estimates an emphasized section in the sound section of the input sound, in which the user emphasizes their utterance, as the paralinguistic information which is the information relating to the user's attitude of mind including their intention, emotion, and the like based on the detection of prosodic information including the pitch (tone of the voice), power (volume of the voice), utterance speed (speed of the voice), and the like of the input sound by the user.

In addition, the user information estimation unit 58 supplies the user information representing the emphasized section from the user information estimation unit 58 to the matching unit 56 and the generation unit 57.

FIG. 13 is a diagram illustrating a method of estimating the emphasized section in the sound section of the input sound as the paralinguistic information by the paralinguistic information extracting unit 58B.

That is, FIG. 13 shows a waveform, pitch, and power of each of the input sounds without emphasis (normal sound) and the input sound with a partial emphasis (emphasized sound) of the utterance "SEKAI ISAN (world heritage)".

Here, "ISAN (heritage)" in the "SEKAI ISAN (world heritage)", that is, "isaN" in "sekaiisaN" when notated in syllables is emphasized and uttered in the emphasized sound "SEKAI ISAN (world heritage)".

In FIG. 13, distinguishing difference is observed in the pitch and the power of the part (especially "saN" in) "ISAN (heritage)" which is emphasized and uttered (hereinafter, also referred to as an emphasized section) in the normal sound "SEKAI ISAN (world heritage)" and the emphasized sound "SEKAI ISAN (world heritage)".

Thus, the paralinguistic information extracting unit 58B estimates the emphasized section based on the pitch and the power of the input sound.

That is, the paralinguistic information extracting unit 58B detects the pitch of the input sound, for example, to obtain the average pitch. Moreover, the paralinguistic information extracting unit 58B obtains a multiplied value obtained by multiplying the average pitch by a predetermined coefficient (for example, a value of 1.2 or the like which is equal to or greater than 1.0), for example, as a threshold value for emphasis for estimating the emphasized section and estimates the emphasized section (in the sound section) of the input sound based on the magnitude relationship between the pitch of the input sound and the threshold value for emphasis.

Specifically, the paralinguistic information extracting unit 58B detects the section whose pitch is equal to or greater than (or exceeds) the threshold value for emphasis in the sound section of the input sound and estimates the candidate section as the emphasized section.

As for the normal sound in FIG. 13, the average pitch is 119.59 Hz, and the threshold value for emphasis which is a multiplied value obtained by multiplying the average pitch by 1.2 as a predetermined coefficient is 143.51 Hz.

Since there is no section whose pitch exceeds 143.51 Hz as the threshold value for emphasis in the sound section of the normal sound, no candidate section is detected.

On the other hand, the average pitch of the emphasized sound in FIG. 13 is 175.58 Hz, and the threshold value for emphasis as the multiplied value obtained by multiplying the average pitch by 1.2 as the predetermined coefficient is 210.94 Hz.

In addition, since there is a section whose pitch exceeds 143.51 Hz as the threshold value for emphasis in the sound section of the emphasized sound, that is, since the pitch exceeds the threshold value for emphasis in the section "ISAN (heritage)", the section "ISAN (heritage)" is detected as the candidate section and thus as the emphasized section.

In addition, the width of a so-called isolated candidate section around which another candidate section is not present within a first time period T1 set in advance as a minimum time interval between two adjacent emphasized sections is shorter than a second time period T set in advance as a minimum time period for one emphasized section, it is possible that the candidate section is not estimated to be an emphasized section due to its excessively short time length as an emphasized section.

In addition, when the time interval between two adjacent candidate sections is shorter than the first time period T1, the two candidate sections can be estimated to be one emphasized section from the top of the candidate section which precedes in terms of time to the end of the candidate section which follows in terms of time.

Figure 14:
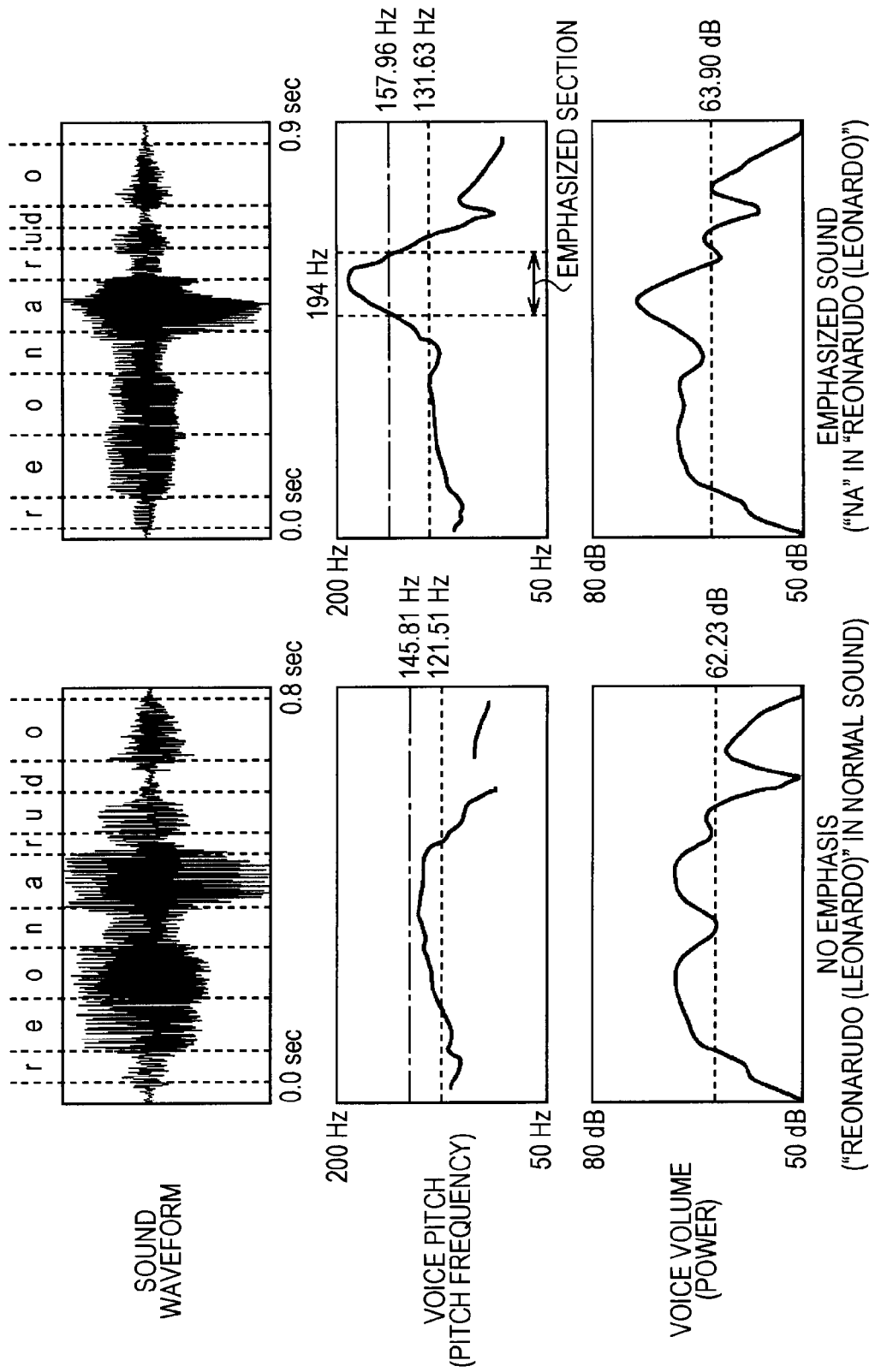
FIG. 14 is a diagram illustrating a method of estimating an emphasized section in a sound section of input sound as paralinguistic information by a paralinguistic information extracting unit.

FIG. 14 is a diagram illustrating a method of estimating the emphasized section in the sound section of the input sound as the paralinguistic information by the paralinguistic information extracting unit 58B.

That is, FIG. 14 shows a waveform, pitch, and power of each of the input sound without emphasis (normal sound) and the input sound with partial emphasis (emphasized sound) of the utterance "REONARUDO (Leonardo)".

Here, "NA" in "REONARUDO (Leonardo)", that is, "NA" in "REONARUDO" when notated in phonemes is emphasized and uttered in the emphasized sound "REONARUDO (Leonardo)".

In FIG. 14, distinguishing differences are observed in the pitch and the power of (particularly "a" in) the emphasized part "NA" in the normal sound "REONARUDO (Leonardo)" and the emphasized sound "REONARUDO (Leonardo)".

Thus, the paralinguistic information extracting unit 58B estimates the emphasized section based on the pitch and the power of the input sound.

That is, the paralinguistic information extracting unit 58B detects the pitch of the input sound and obtains the average pitch in the same manner as in FIG. 13. Moreover, the paralinguistic information extracting unit 58B obtains as a threshold value for emphasis the multiplied value obtained by multiplying the average pitch by 1.2, for example, as a predetermined coefficient, detects the candidate section based on the magnitude relationship between the pitch of the input sound and the threshold value for emphasis, and thus estimates the emphasized section (in the sound section) of the input sound.

As for the normal sound in FIG. 14, the average pitch is 121.51 Hz, and the threshold value for emphasis which is the multiplied value obtained by multiplying the average pitch by 1.2 as the predetermined coefficient is 145.81 Hz.

Then, since the section whose pitch exceeds the threshold value for emphasis 145.81 Hz is not present in the sound section of the normal sound, no candidate section is detected.

On the other hand, as for the emphasized sound in FIG. 14, the average pitch is 131.63 Hz, and the threshold value for emphasis which is the multiplied value obtained by multiplying the average pitch by 1.2 as the predetermined coefficient is 157.96 Hz.

In the sound section of the emphasized sound, there is a section whose pitch exceeds the threshold value for emphasis 157.96 Hz, that is, the pitch exceeds the threshold value for emphasis in the section "NA", the section "NA" is detected as a candidate section and thus estimated as an emphasized section.

In addition, since the pitch is mainly affected by a vowel, it is possible to expand the candidate section up to the position of the top of the syllable including a vowel which is present at the top thereof (for example, the top of consonants preceding the vowel) and estimate the candidate section after the expansion as an emphasized section.

Although the above description was made in which the paralinguistic information extracting unit 58B estimates the emphasized section with the use of the pitch, it is also possible to estimate the emphasized section with the use of the power or the utterance speed instead of the pitch.

That is, the paralinguistic information extracting unit 58B can detect as the candidate section the section whose power is equal to or greater than a predetermined threshold value (a multiplied value obtained by multiplying the average value of the power by a predetermined coefficient), for example, from among the sound section and estimate the candidate section as the emphasized section.

In addition, the paralinguistic information extracting unit 58B can detect as the candidate section the section whose utterance speed is equal to or smaller than a predetermined threshold value, for example, from among the sound section and estimate the candidate section as an emphasized section.

Figure 15:
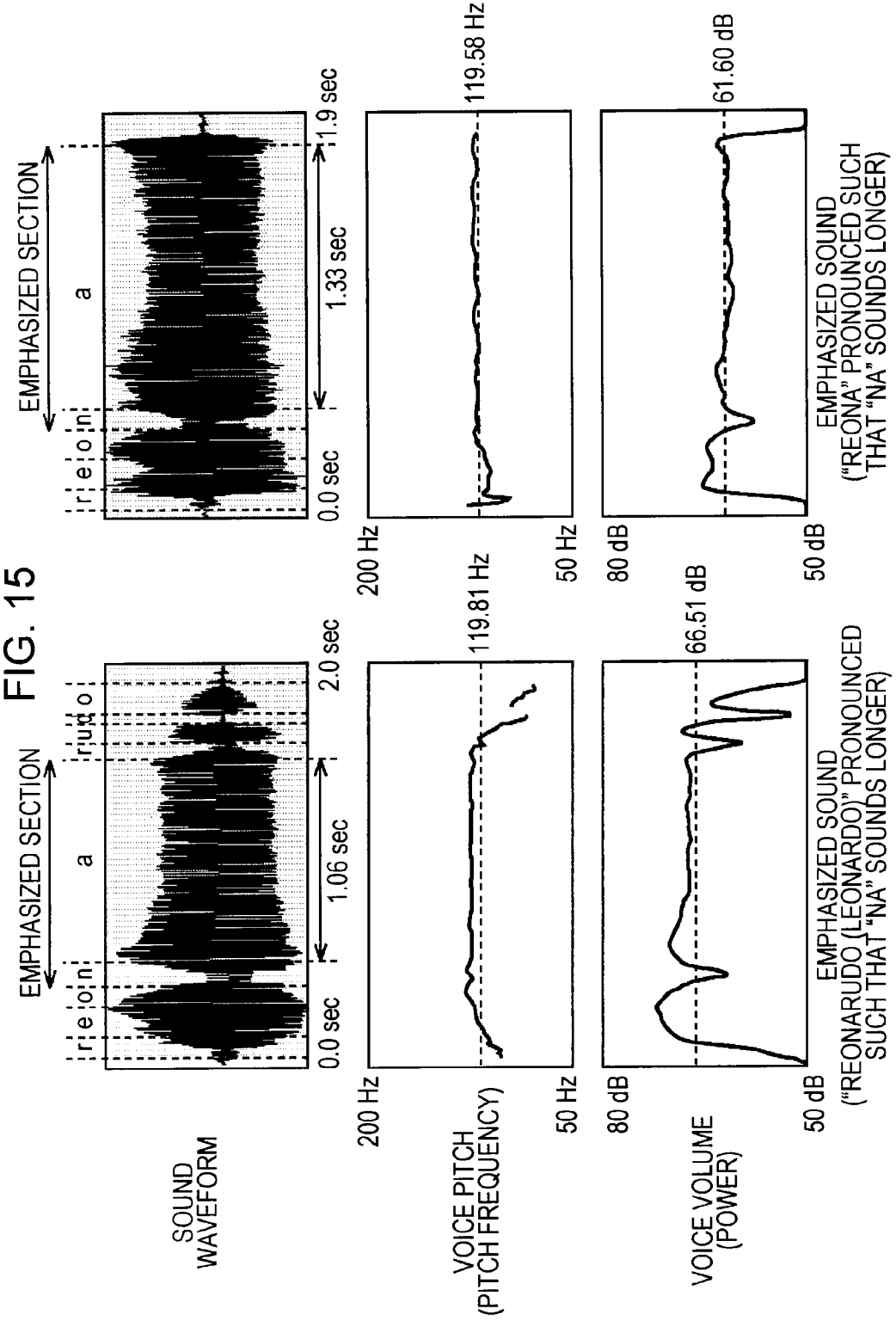
FIG. 15 is a diagram illustrating a method of estimating an emphasized section in a sound section of input sound using an utterance speed by a paralinguistic information extracting unit.

FIG. 15 is a diagram illustrating a method of estimating an emphasized section in a sound section of input sound using the utterance speed by the paralinguistic information extracting unit 58B.

That is, FIG. 15 shows a waveform, pitch, and power of each of the input sound with partial emphasis (emphasized sound) of the utterance "REONARUDO (Leonardo)" and the input sound with partial emphasis (emphasized sound) of the utterance "REONA".

In the emphasized sound "REONARUDO (Leonardo)", "NA" in "REONARUDO", that is, "NA" in "reonarudo" when notated in phonemes is emphasized and uttered.

In the emphasized sound "REONA", "NA" in "REONA", that is, "NA" in "REONA" when notated in phonemes is emphasized and uttered.

Here, in FIG. 15, a part of the utterance is emphasized by delaying the utterance speed at the part of the utterance.

When the emphasized section is estimated using the utterance speed, the paralinguistic information extracting unit 58B obtains an inverse number of the section (time period) of each phoneme (hereinafter, also referred to as a phoneme section) of the sound section as the utterance speed of the phoneme.

In addition, the paralinguistic information extracting unit 58B estimates an emphasized section (in the sound section) of the input sound based on the magnitude relationship between the utterance speed and the predetermined threshold value.

Specifically, the paralinguistic information extracting unit 58B detects as a candidate section of an emphasized section a section in which the utterance speed is equal to or lower than (or below) the predetermined threshold value, that is, a phoneme section which is equal to or longer than 1 second, for example, as a time period represented by an inverted number of the predetermined threshold value and estimates the candidate section as an emphasized section.

In the emphasized sound "REONARUDO (Leonardo)" in FIG. 15, the length of the phoneme section of the phoneme "a" is 1.06 seconds, which satisfies the condition of equal to or longer than 1 second, and the phoneme section is detected as a candidate section.

In addition, in the emphasized sound "REONA" in FIG. 15, the length of the phoneme section of the phoneme "a" is 1.33 seconds, which satisfies the condition of equal to or longer than 1 second, and the phoneme section is detected as a candidate section.

Accordingly, the phoneme sections of the phoneme "a" are estimated as emphasized sections for both the emphasized sound "REONARUDO (Leonardo)" and "REONA" in FIG. 15.

Since phonemes which can have phoneme sections equal to or longer than 1 second are mainly vowels, a candidate section can be expanded up to the position of the top of a syllable including a vowel existing at the top thereof, and the candidate section after the expansion can be estimated as an emphasized section, when the vowel is at the top of the candidate section.

Although the description was made of the above case in which the paralinguistic information extracting unit 58B estimated an emphasized section using one of the pitch, power, and the utterance speed, it is also possible to estimate the emphasized section using plural factors from among the pitch, the power, and the utterance speed.

That is, the paralinguistic information extracting unit 58B can estimate as an emphasized section a section at which a candidate section detected using the pitch is superimposed with a candidate section detected using the power or a section which is at least one of the candidate section detected using the pitch and the candidate section detected using the power, for example.

In addition, the paralinguistic information extracting unit 58B can encourage the user to sequentially perform the same utterance with the normal sound and with the emphasized sound, compare the pitch, the power, and the utterance speed in the normal sound of the first utterance with the pitch, the power, and the utterance speed in the emphasized sound of the second utterance, respectively, and estimate the section, in which a significant difference (a difference which is equal to or greater than a threshold value) is present in the pitch, the power, or the utterance speed in the comparison, as an emphasized section.

[Matching in Relevant Word Usage Matching Mode]

Figure 16:
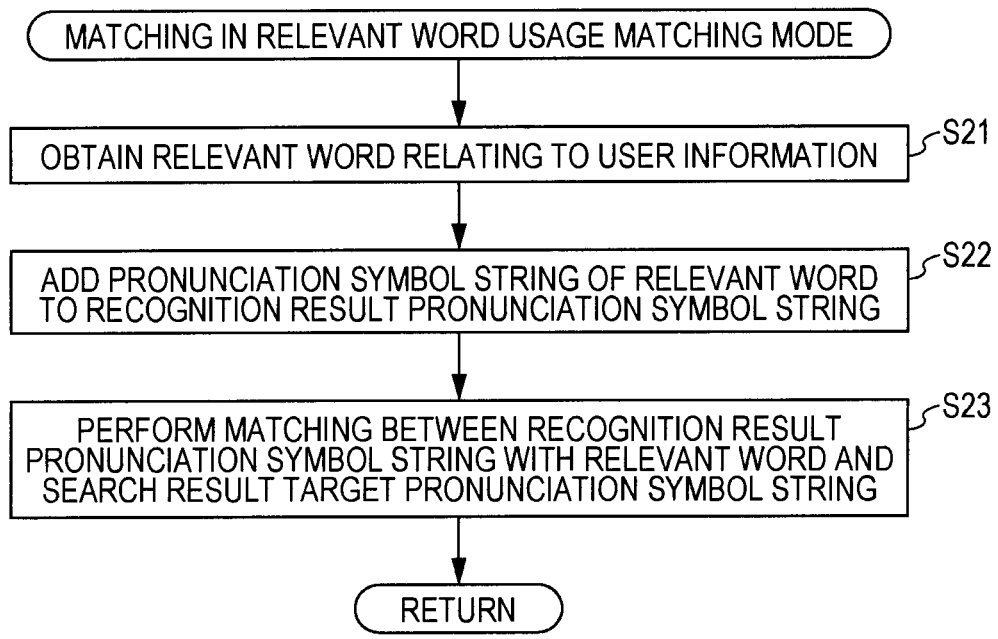
FIG. 16 is a flow chart illustrating matching processing in a relevant word usage matching mode.

FIG. 16 is a flow chart illustrating matching processing in a relevant word usage matching mode performed in Step S14 in FIG. 11 by the matching unit 56 when the operation mode of the sound search apparatus 10 in FIG. 2 is set to the relevant word usage matching mode.

In Step S21, the matching unit 56 obtains the relevant words relating to the user information supplied from the user information estimating unit 58.

That is, when (the nonverbal information extracting unit 58A of) the user information estimating unit 58 estimates the sex of the user who uttered the input sound, and the user information (including the nonverbal information) representing the sex as the estimation result is supplied to the matching unit 56, for example, the matching unit 56 obtains the relevant words relating to the sex of the user represented by the user information in Step S21.

Here, when the sex of the user represented by the user information is "female", examples of the relevant words relating to "female" include "ONNA (woman)", "ONNA (woman)", "OKASAN (mother)", "MAMA (mom)", "SUITSU (sweets)", "OYATSU (snack)", "DAIETTO (diet)", "OBENTO (packed lunch)", and the like, for example.

When the sex of the user represented by the user information is "male", examples of the relevant words relating to "male" include "OTOKO (man)", "OTOKO (man)", "OTOSAN (father)", "PAPA (dad)", "TSUMAMI (nibbles)", "SAKE (alcohol)", and the like.

It is possible to register the relevant words relating to the sex of the user in advance in the sound search apparatus 10 by the designer of the apparatus.

Moreover, it is possible to search words which frequently appear along with the words representing sex such as "male", "female", and the like from text database such as web pages on the internet, predetermined corpora, and the like, for example, and register the words as the relevant words relating to the sex of the user in the sound search apparatus 10.

In addition, when (the nonverbal information extracting unit 58A of) the user information estimation unit 58 estimates a user who uttered the input sound based on the speaker specification, and the user information (including the nonverbal information) representing the user specifying information for specifying the user is supplied to the matching unit 56, the matching unit 56 obtains the relevant words relating to the user specified by the user specifying information represented by the user information.

Here, it is assumed that the recorder in FIG. 1 creates and stores in advance a user table in which the user specifying information is associated with information relating to the user including preference or action history (for example, titles or a category of programs which is frequently viewed or video-recorded by the user, the operation history of the operation unit 31 (FIG. 1), and the like) of the user specified by the user specifying information, and the like as described above.

In this case, the matching unit 56 obtains the information associated with the user specifying information represented by the user information in the user table such as (each word of word strings representing) titles or a category of programs which are frequently viewed or video-recorded by the user, as the relevant words relating to the user specified by the user specifying information represented by the user information.

In addition, the user can operate the operation unit 31 (FIG. 1) to register the words which can be the relevant words relating to the user in the user table.

The matching unit 56 obtains the relevant words relating to the user information supplied from the user information estimation unit 58 and then adds the relevant words to the recognition result pronunciation symbol string supplied from the sound recognition unit 51 through the pronunciation symbol conversion unit 52 in Step S22.

That is, the matching unit 56 adds the pronunciation symbol string of the relevant word to the top or the end of the recognition result pronunciation symbol string.

Then, in Step S23, for each of all the search result target word strings stored in the search result target storage unit 53, the matching unit 56 performs matching (calculates similarity degree) between the recognition result pronunciation symbol string to which the relevant word has been added and the search result target pronunciation symbol string supplied from the search result target storage unit 53 through the morpheme analyzing unit 54 and the pronunciation symbol conversion unit 55 and supplies the matching result (similarity degree) to the generation unit 57, and the processing is returned.

Accordingly, the matching unit 56 performs matching between the recognition result pronunciation symbol string itself and the search result target pronunciation symbol string in the normal mode while the matching unit 56 performs matching between the recognition result pronunciation symbol string to which the relevant word has been added and the search result target pronunciation symbol string in the relevant word usage matching mode.

As a result, it is possible to obtain flexible search result word strings which are different in accordance with the user (itself or the sex thereof) as the speakers in the relevant word usage matching mode.

That is, when the sex of the user has been estimated, and the user information representing the sex has been supplied from the user information estimation unit 58 to the matching unit 56, for example, the matching unit 56 adds aforementioned relevant words "ONNA (woman)" and the like relating to "female" to the recognition result pronunciation symbol string and subjects the recognition result pronunciation symbol string to matching if the sex of the user represented by the user information is "female".

Accordingly, it is possible to obtain a matching result in which the search result target word strings suitable for female user who has made the utterance are ranked in the highest orders, and thus a search result in which such search result target word strings are selected as the search result word strings, as compared with the case in which matching is performed without adding the relevant words "ONNA (woman)" and the like to the recognition result pronunciation symbol string.

In addition, when the sex of the user represented by the user information is "male", the matching unit 56 adds the aforementioned relevant words "OTOKO (man)" and the like relating to "male" to the recognition result pronunciation symbol string and subjects the recognition result pronunciation symbol string to matching.

Accordingly, it is possible to obtain a matching result in which the search result target word strings suitable for male user who has made the utterance are ranked in the highest orders, and thus a search result in which such search result target word strings are selected as the search result word strings, as compared with the case in which matching is performed without adding the relevant words "OTOKO (man)" and the like to the recognition result pronunciation symbol string.

Moreover, when the sex of a user is estimated, and the user information representing the user specifying information specifying the user is supplied from the user information estimation unit 58 to the matching unit 56, for example, the matching unit 56 performs matching by adding a title or the like of a program frequently viewed by the user specified by the user specifying information represented by the user information as a relevant word to the recognition result pronunciation symbol string.

Accordingly, as compared with the case of performing matching without adding a title or the like of a program frequently viewed by the user to the recognition result pronunciation symbol string, it is possible to obtain a matching result in which the search result target word string (suitable for the user) in accordance with the preference of the user who has made the utterance is positioned in rank order, and thus a search result specific to an individual user, in which such a search result target word string is obtained as a search result word string.

In addition, when the matching unit 56 obtains plural relevant words in the relevant word usage matching mode, each relevant word is sequentially selected as a word to which attention is to be paid, for example, and the word to which attention is to be paid is added to the recognition result pronunciation symbol string and then subjected to matching with the search result target pronunciation symbol string.

[Matching in Relevant Word Usage Sorting Mode]

Figure 17:
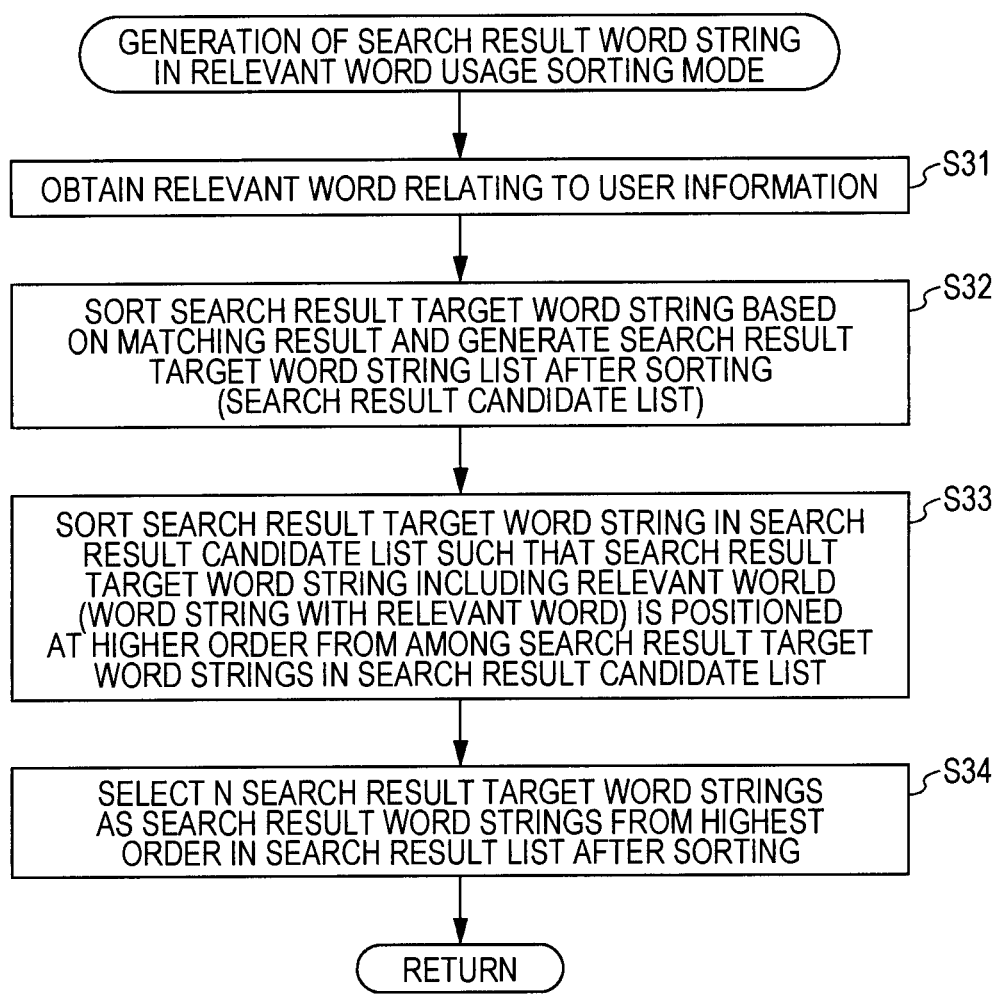
FIG. 17 is a flow chart illustrating a processing of generating a search result word string in a relevant word usage sorting mode.

FIG. 17 is a flow chart illustrating processing of generating a search result word string in a relevant word usage sorting mode performed in Step S15 in FIG. 11 by the generation unit 57 when the operation mode of the sound search apparatus 10 in FIG. 2 is set to the relevant word usage sorting mode.

In Step S31, the generation unit 57 obtains the relevant words relating to the user information supplied from the user information estimation unit 58.

That is, the generation unit 57 obtains the relevant words relating to the sex of the user represented by the user information from the user information estimation unit 58 and the relevant words relating to the user specified by the user specifying information represented by the user information in the same manner as in the case in which the matching unit 56 obtains the relevant words in Step S21 in FIG. 16.

The generation unit 57 obtains the relevant words relating to the user information supplied from the user information estimation unit 58, then sorts the search result target word strings stored in the search result target storage unit 53 based on the similarity degree as the matching result from the matching unit 56, and generates a list of the search result target word strings after sorting (hereinafter, also referred to as a search result candidate list) in Step S32.

That is, the generation unit 57 generates the search result candidate list in which the search result target word strings stored in the search result target storage unit 53 are registered in the ascending order of the similarity degrees.

Then, the generation unit 57 sorts the search result target word strings in the search result candidate list such that the search result target word strings including the relevant words (hereinafter, also referred to as word strings with relevant words) from among the search result target word strings in the search result candidate list are positioned in rank order in Step S33.

That is, the generation unit 57 detects the word strings with the relevant words from among the search result target word strings in the search result candidate list and moves the word strings with the relevant words to the higher rank order in the search result candidate list while keeping the order relationship among the word strings with the relevant words.

Accordingly, even though a search result target word string with a high (large) similarity degree is positioned in the lower rank order than a word string with a relevant word in the order of the search result candidate list for the search result target word strings as long as the search result target word string does not include a relevant word.

Thereafter, in Step S34, the generation unit 57 generates search result word strings by selecting the highest ranked N search result target word strings in the search result candidate list as a search result word strings, and the processing is returned.

Accordingly, the generation unit 57 selects the search result target word strings with the highest ranked N similarity degrees as the search result word strings from among the search result target word strings stored in the search result target storage unit 53 in the normal mode while the generation unit 57 selects the search result word strings with the highest ranked N similarity degrees as the search result word strings from among the search result word strings including relevant words (word strings with relevant words) in the relevant word usage sorting mode.

As a result, it is possible to obtain flexible search result word strings which are different in accordance with a user (speakers) in the relevant word usage sorting mode.

That is, FIG. 18 is a diagram illustrating a search result word string generated in the relevant word usage sorting mode by the generation unit 57 when the user information representing the sex of the user is supplied from the user information estimation unit 58 to the generation unit 57.

If it is assumed that both a female user and a male user utter input the sound "RYORI (cooking)", the generation unit 57 selects the search result target word strings with the highest ranked N similarity degrees as the search result word strings for both the female user and the male user in the normal mode. Accordingly, the same search result word strings can be obtained with respect to the same input sound "RYORI (cooking)" for both the female user and the male user in the normal mode.

On the other hand, when the sex of the user represented by the user information is "female" in the relevant word usage sorting mode, the generation unit 57 selects the search result target word string with the highest ranked N (5 in FIG. 18) similarity degrees from among the search result target word strings including the relevant words "ONNA (woman)", "ONNA (woman)", "OKASAN (mother)", "MAMA (mom)", "SUITSU (sweets)", "OYATSU (snack)", "DAIETTO (diet)", "OBENTO (packed lunch)", and the like relating to "female" described with reference to FIG. 17 as the search result word strings for "female" which is the sex of the user.

In addition, when the sex of the user represented by the user information is "male", the generation unit 57 selects the search result target word strings with the highest ranked N similarity degrees from among the search result target word strings including the relevant words "OTOKO (man)", "OTOKO (man)", "OTOSAN (father)", "PAPA (dad)", "TSUMAMI (nibbles)", "SAKE (alcohol)", and the like relating to "male" described with reference to FIG. 17 as the search result word strings for "male" which is the sex of the user.

Accordingly, it is possible to obtain the search result in which the search result target word strings suitable for the user of the sex are selected as the search result word strings depending on the sex of the user who uttered the input sound in the relevant word usage sorting mode.

FIG. 19 is a diagram illustrating search result word strings which are respectively generated in the normal mode and in the relevant word usage sorting mode by the generation unit 57 when the user information representing the user specifying information specifying the user is supplied from the user information estimation unit 58 to the generation unit 57.

If it is assumed that the user utters the input sound "RYORI (cooking)", the generation unit 57 selects the search result target word strings with the highest ranked N similarity degrees with respect to the input sound "RYORI (cooking)" as the search result word strings for any user in the normal mode. That is, the same search result word strings are obtained with respect to the same input sound "RYORI (cooking)" regardless of which user is the speaker in the normal mode.

On the other hand, if it is assumed that a user specified by the user specifying information represented by the user information frequently views a program whose title is "SHOKUSAI ROMAN (romantic beautiful food)", for example, and the title "SHOKUSAI ROMAN (romantic beautiful food)" is obtained as a relevant word, the generation unit 57 selects the search result target word strings with the highest ranked N (5 in FIG. 18) similarity degrees with respect to the input sound "RYORI (cooking)" from among the search result target word strings including the relevant word "SHOKUSAI ROMAN (romantic beautiful food)" as the search result word strings specific to the user who has uttered the input sound "RYORI (cooking)" in the relevant word usage sorting mode.

Accordingly, it is possible to obtain the search result in which the search result target word strings suitable for the user are selected as the search result word strings in accordance with user preference or the like such as a program frequently viewed by the user who has uttered the input sound in the relevant word usage sorting mode.

In addition, when the generation unit 57 obtains plural relevant words, it is possible to sort the search result target word strings in the search result candidate list such that the word strings with the relevant words are lined up in the upper order regardless the number of the relevant words included in the word strings with the relevant words as long as the generation unit 57 obtains the search result target word strings including relevant words (word strings with the relevant words), or sort the search result target word strings in the search result candidate list in accordance with the number of the relevant words included in the word strings with the relevant words in the relevant word usage sorting mode.

When the generation unit 57 sorts the search result target word strings in the search result candidate list in accordance with the number of the relevant words included in the word strings with the relevant words, it is possible to sort the search result target word strings in the search result candidate list such that the word strings with more relevant words included are lined up in the higher or lower orders.

Here, it is possible to obtain the same search result word strings suitable for the user which can be obtained in the relevant word usage sorting mode shown in FIGS. 18 and 19 even in the relevant word usage matching mode described with reference to FIG. 16.

[Matching in Weighting Matching Mode]

Figure 20:
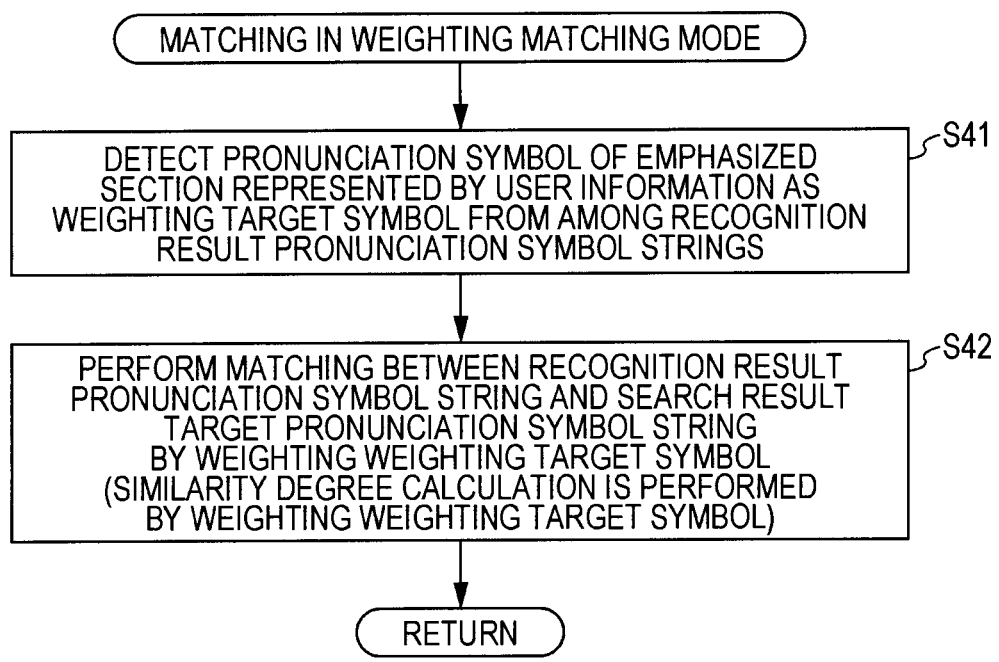
FIG. 20 is a flow chart illustrating matching processing in a weighting matching mode.

FIG. 20 is a flow chart illustrating matching processing in a weighting matching mode performed by the matching unit 56 in Step S14 in FIG. 11 when the operation mode of the sound search apparatus 10 in FIG. 2 is set to the weighting matching mode.

In Step S41, the matching unit 56 detects the pronunciation symbol (string) of the emphasized section represented by the user information, which is supplied from the user information estimation unit 58, in the recognition result pronunciation symbol strings supplied from the sound recognition unit 51 through the pronunciation symbol conversion unit 52 as a weighting target symbol.

Thereafter, in Step S42, the matching unit 56 performs matching (calculation of the similarity degree) between the recognition result pronunciation symbol string and the search result target pronunciation symbol string supplied from the search result target storage unit 53 through the morpheme analyzing unit 54 and the pronunciation symbol conversion unit 55 for each of all the search result target word strings stored in the search result target storage unit 53 by weighting the weighting target symbol from among the recognition result pronunciation symbol string.

Then, the matching unit 56 supplies the matching result (similarity degree) to the generation unit 57, and the processing is returned.

Accordingly, the matching unit 56 performs matching between the recognition result pronunciation symbol string and the search result target pronunciation symbol string without performing any weighting in the normal mode while the matching unit 56 performs matching by weighting the weighting target symbol as a pronunciation symbol in the emphasized section in the recognition result pronunciation symbol string in the weighting matching mode.

As a result, it is possible to obtain flexible search result word strings which are different in accordance with the emphasized section, which is emphasized and uttered by the user, in the input sound in the weighting matching mode.

Figure 21:
FIGS. 21A and 21B are diagrams illustrating matching processing in a weighting matching mode.

FIGS. 21A and 21B are diagrams illustrating matching processing in the weighting matching mode.

That is, FIG. 21A is a diagram illustrating calculation of similarity degrees (matching) between the sound recognition result and the search result target word strings performed by the matching unit 56 using the vector substitution information instead of the search result target vectors in the weighting matching mode.

In FIG. 21A, the pronunciation symbols of the same syllable which appears plural times in the search result target word strings are distinguished from each other and expressed in the vector substitution information in the same manner as in FIGS. 9 and 10.

In addition, in FIG. 21A, (the recognition result pronunciation symbol string) of the sound recognition result is expressed in the vector substitution information instead of the recognition result vectors in the same manner as for (the search result target pronunciation symbol string of) the search result target word string expressed in the vector substitution information instead of the search result target vector in the same manner as in FIG. 10.

As described in FIG. 10, when a cosine distance or a corrected distance is obtained as the similarity degree between the sound recognition result and the search result target word string, it is necessary to provide the inner product $V_{UTR} V_{TITLE}(i)$ between the recognition result vector $V_{UTR}$ and the search result target vector $V_{TITLE}(i)$.

In the normal mode, the inner product $V_{UTR} V_{TITLE}(i)$, by setting the initial value of the inner product $V_{UTR} V_{TITLE}(i)$ to 0, can be obtained by sequentially paying attention to the pronunciation symbols constituting the vector substitution information of the sound recognition result and incrementing the inner product $V_{UTR} V_{TITLE}(i)$ by 1 when the pronunciation symbol which coincides with the symbol to which attention is to be paid is present in the vector substitution information of the search result target word string.

On the other hand, in the weighting matching mode, when the symbol to which attention is to be paid is not the weighting target symbol, the inner product $V_{UTR} V_{TITLE}(i)$ is incremented by 1 in the same manner as in the normal mode when the pronunciation symbol which coincides with the symbol to which attention is to be paid is present in the vector substitution information of the search result target word string.

In addition, when the symbol to which attention is to be paid is a weighting target symbol, the inner product $V_{UTR} V_{TITLE}(i)$ is incremented by a value to which weight (for example, 2 or the like which is greater than 1) is added to 1 as the increment amount in the case of the normal mode if the pronunciation symbol which coincides with the symbol to which the attention is to be paid is present in the vector substitution information of the search result target word string.

As a result, the similarity degree of the search result target word string including in the search result target pronunciation symbol string the same pronunciation symbol as the pronunciation symbol (weighting target symbol) of the emphasized part which the user has emphasized and uttered from among the recognition result pronunciation symbol string of the sound recognition result of the input sound in the weighting matching mode is greater than that in the case of the normal mode, and such a search result target word string can easily be obtained as the search result word string.

FIG. 21B shows a cosine distance as the similarity degree obtained in each of the normal mode and the weighting matching mode when "ISAN (heritage)" in the input sound "SEKAI ISAN (world heritage)" is emphasized and uttered.

FIG. 21B shows the similarity degrees between each of the three search result target word strings "ZA SEKAI ISAN (the world heritage)", "SEKAI NO SORA (world skyscapes)", and "KENJA NO ISAN (heritage of wise men)" and (the sound recognition result of) the input sound "SEKAI ISAN (world heritage)" obtained in each of the normal mode and the weighting matching mode.

In the normal mode, the similarity degree of the search result target word string "ZA SEKAI ISAN (the world heritage)" including all parts of the input sound "SEKAI ISAN (world heritage)" is 0.926, the similarity degree of the search result target word string "SEKAI NO SORA (world skyscapes)" including a part "SEKAI (world)" of the input sound is 0.500, and the similarity degree of the search result target word string "KENJA NO ISAN (heritage of wise men)" including another part "ISAN (heritage)" of the input sound is 0.463, respectively.

Accordingly, since the similarity degree (0.500) of the search result target word string "SEKAI NO SORA (world skyscapes)" is greater than the similarity degree (0.463) of the search result target word string "KENJA NO ISAN (heritage of wise men)" when the search result target word string "SEKAI NO SORA (world skyscapes)" and the search result target word string "KENJA NO ISAN (heritage of wise men)", each of which includes a part of the input sound, are compared with each other, the search result target word string "SEKAI NO SORA (world skyscapes)" which does not include the emphasized part "ISAN (heritage)" in the input sound "SEKAI ISAN (world heritage)" is more easily obtained as the search result word string for the input sound "SEKAI ISAN (world heritage)" as compared with the search result target word string "KENJA NO ISAN (heritage of wise men)" which includes the emphasized part "ISAN (heritage)" in the input sound "SEKAI ISAN (world heritage)".

On the other hand, in the weighting matching mode, the similarity degree of the search result target word string "ZA SEKAI ISAN (the world heritage)" including all parts of the input sound "SEKAI ISAN (world heritage)" is 0.949, the similarity degree of the search result target word string "SEKAI NO SORA (world skyscapes)" including a part "SEKAI (world)" of the input sound is 0.378, and the similarity degree of the search result target word string "KENJA NO ISAN (heritage of wise men)" including another part "ISAN (heritage)" of the input sound is 0.556, respectively.

Accordingly, since the similarity degree (0.378) of the search result target word string "SEKAI NO SORA (world skyscapes)" is smaller than the similarity degree (0.556) of the search result target word string "KENJA NO ISAN (heritage of wise men)" when the search result target word string "SEKAI NO SORA (world skyscapes)" and the search result target word string "KENJA NO ISAN (heritage of wise men)", each of which includes a part of the input sound, are compared with each other, the search result target word string "KENJA NO ISAN (heritage of wise men)" which includes the emphasized part "ISAN (heritage)" in the input sound "SEKAI ISAN (world heritage)" is more easily obtained as the search result word string for the input sound "SEKAI ISAN (world heritage)" as compared with the search result target word string "SEKAI NO SORA (world skyscapes)" which does not include the emphasized part "ISAN (heritage)" in the input sound "SEKAI ISAN (world heritage)".

As described above, in the weighting matching mode, the similarity degree of the search result target word string including the emphasized part is greater than that in the case of the normal mode, and such a search result target word string is more easily obtained as the search result word string.

FIG. 22 is a diagram illustrating search result word strings which are respectively obtained in the normal mode and in the weighting matching mode when "ISAN (heritage)" in the input sound "SEKAI ISAN (world heritage)" is emphasized and uttered.

In the normal mode, the search result target word string including all parts of the input sound "SEKAI ISAN (world heritage)" is obtained as the search result word string while substantially the same numbers of the search result target word strings which include only the part "SEKAI (world)" which is not the emphasized part in the input sound "SEKAI ISAN (world heritage)" and the search result target word strings which include only the emphasized part "ISAN (heritage)" in the input sound "SEKAI ISAN (world heritage)" are obtained as the search result word strings.

On the other hand, in the weighting matching mode, the search result target word string which includes all parts of the input sound "SEKAI ISAN (world heritage)" is obtained as the search result word string in the same manner as in the normal mode while more search result target word strings which include only the emphasized part "ISAN (heritage)" in the input sound "SEKAI ISAN (world heritage)" are obtained as the search result word strings than those in the normal mode.

Conversely, in the weighting matching mode, it is possible to suppress the number of the search result target word strings which include the non-emphasized part "ISAN (heritage)" but the part "SEKAI (world)" which is the non-emphasized part in the input sound "SEKAI ISAN (world heritage)" obtained as the search result word strings.

[Description of Computer to which the Present Disclosure is Applied]

Next, the aforementioned series of processings can be performed by hardware or software. When the series of processings is performed by software, a program constituting the software is installed in a general-purpose computer or the like.

Figure 23:
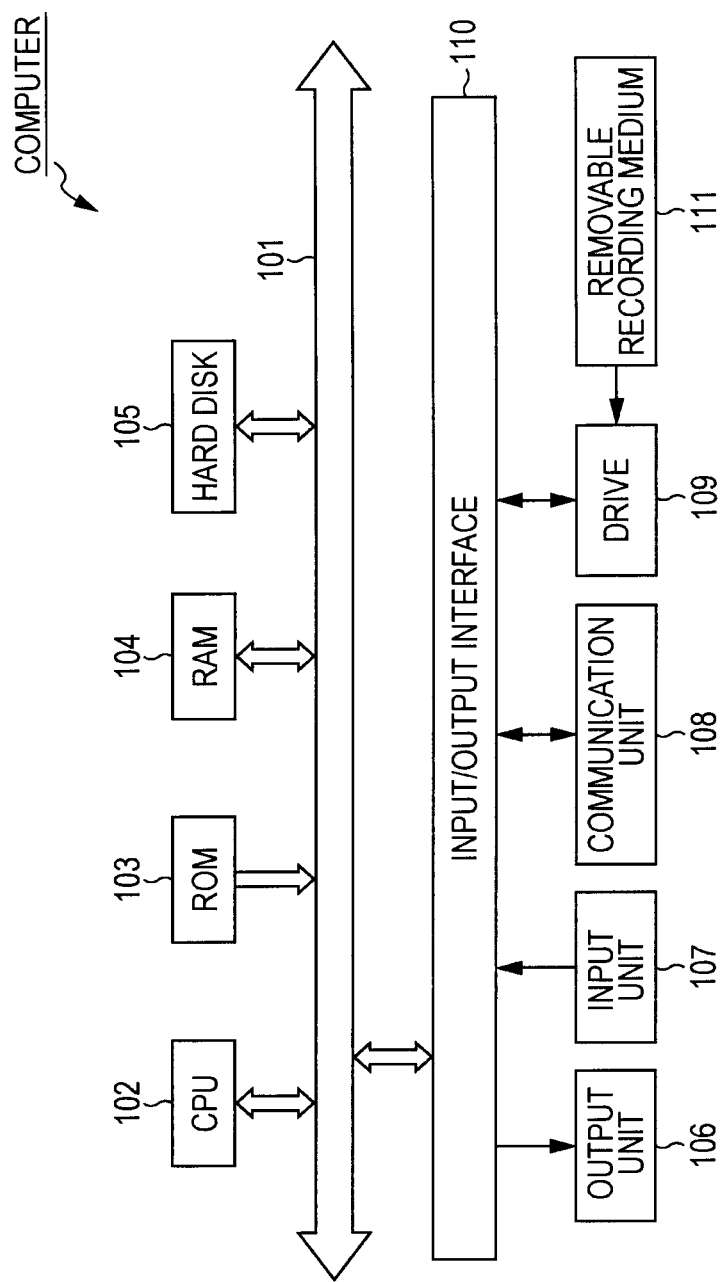
FIG. 23 is a block diagram illustrating a configuration example of a computer according to an embodiment to which the present disclosure is applied.

Thus, FIG. 23 shows a configuration example of a computer according to an embodiment, in which the program performing the aforementioned series of processings is installed.

The program can be recorded in advance in a hard disk 105 or a ROM 103 as a recording medium incorporated in the computer.

Alternatively, the program can be stored (recorded) in a removable recording medium 111. Such a removable recording medium 111 can be provided as so-called package software. Here, examples of the removable recording medium 111 include a flexible disc, a CD-ROM (Compact Disc Read Only Memory), an MO (Magneto Optical) disc, a DVD (Digital Versatile Disc), a magnetic disk, a semiconductor memory, and the like.

In addition, the program can be installed in the computer from the removable recording medium 111 as described above or downloaded to the computer through a communication network or broadcast network and installed in a built-in hard disk 105. That is, the program can be transferred in a wireless manner from a download site to a computer through a space satellite for digital satellite broadcast or transferred in a wired manner to a computer through a network such as a LAN (Local Area Network) or the internet.

The computer is provided with a built-in CPU (Central Processing Unit) 102, and an input output interface 110 is connected to the CPU 102 through a bus 101.

When a user inputs an instruction by operating the input unit 107 or the like through the input output interface 110, the CPU 102 executes the program stored in the ROM (Read Only Memory) 103 based on the instruction. Alternatively, the CPU 102 loads in the RAM (Random Access Memory) 104 the program stored in the hard disk 105 and executes the program.

With such an operation, the CPU 102 performs the processing based on the aforementioned flow chart or the processing performed with the configuration shown in the aforementioned block diagram. Then, the CPU 102 causes the output unit 106 to output the processing result through the input output interface 110, causes the communication unit 108 to send the processing result, or causes the hard disk 105 to record the processing result, when necessary.

In addition, the input unit 107 includes a keyboard, a mouse, a microphone, and the like. The output unit 106 includes an LCD (Liquid Crystal Display), a speaker, and the like.

Here, the processing of the computer based on the program in this specification is not necessarily performed in a chronological manner in the order described in the flow chart. That is, the processing of the computer based on the program includes the processing performed in a parallel manner or in a separated manner (for example, parallel processing or processing for each object).

Alternatively, the processing of the program may be performed by one computer (processor) or may be separately performed by plural computers. Moreover, the program may be transferred to and executed in a remote computer.

In addition, the embodiments of the present disclosure are not limited to the aforementioned embodiments, and various modifications can be made within the scope of the present disclosure.

That is, a part or all of the processings of the sound search apparatus 10 can be performed instead by sending necessary data to a server on a LAN or the internet, for example.

The present disclosure contains subject matter related to that disclosed in Japanese Priority Patent Application JP 2010-119767 filed in the Japan Patent Office on May 25, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A search apparatus comprising:
   a sound recognition unit which recognizes input sound;
   a user information estimation unit which estimates at least one of a physical condition and emotional demeanor of a speaker of the input sound based on the input sound and outputs user information representing the estimation result;
   a matching unit which performs matching between a search result target pronunciation symbol string which is a sequence of pronunciation symbols representing pronunciations of a search result target word string and a recognition result pronunciation symbol string which is a sequence of pronunciation symbols representing pronunciations of a sound recognition result for the input sound for each of plural search result target word strings which are word strings as the targets of the search results for the word strings corresponding to the input sound; and
   a generation unit which generates a search result word string as a search result for a word string corresponding to the input sound from the plural search result target word strings based on the matching result between the search result target pronunciation symbol string and the recognition result pronunciation symbol string,
   wherein at least one of the matching unit and the generation unit changes processing in accordance with the user information.

2. The apparatus according to claim 1,
   wherein the generation unit sorts the search result target word strings to select the search result word string in accordance with the user information.

3. The apparatus according to claim 2,
   wherein the user information estimation unit estimates the sex of the speaker, and
   wherein the generation unit sorts the search result target word strings such that the search result target word strings including relevant words relating to the sex of the speaker represented by the user information are positioned in rank order.

4. The apparatus according to claim 2,
   wherein the user information estimation unit performs speaker specification for the speaker to estimate the speaker, and
   wherein the generation unit sorts the search result target word strings such that the search result target word strings including relevant words relating to the speaker represented by the user information are positioned in rank order.

5. The apparatus according to claim 1,
   wherein the matching unit performs matching between the search result target pronunciation symbol string and the recognition result pronunciation symbol string to which relevant words relating to the user information have been added.

6. The apparatus according to claim 5,
   wherein the user information estimation unit estimates the sex of the speaker, and
   wherein the matching unit performs matching between the search result target pronunciation symbol string and the recognition result pronunciation symbol string to which relevant words relating to the sex of the speaker represented by the user information have been added.

7. The apparatus according to claim 5,
   wherein the user information estimation unit performs speaker specification for the speaker to estimate the speaker, and
   wherein the matching unit performs matching between the search result target pronunciation symbol string and the recognition result pronunciation symbol string to which relevant words relating to the speaker represented by the user information have been added.

8. The apparatus according to claim 1,
   wherein the matching unit performs matching between the search result target pronunciation symbol string and the recognition result pronunciation symbol string by weighting a part of the recognition result pronunciation symbol string in accordance with the user information.

9. The apparatus according to claim 8,
   wherein the user information estimation unit estimates an emphasized section, which the speaker emphasizes and utters, in a sound section of the input sound, and wherein the matching unit performs matching between the search result target pronunciation symbol string and the recognition result pronunciation symbol string by weighting a pronunciation symbol in the emphasized section in the recognition result pronunciation symbol string, which is represented by the user information.

10. The apparatus according to claim 9,
wherein the user information estimation unit estimates the emphasized section based on pitch, power, or an utterance speed of the input sound.

11. A search method by a search apparatus which searches a word string corresponding to input sound, the method including:
   recognizing input sound;
   estimating at least one of a physical condition and emotional demeanor of a speaker of the input sound based on the input sound and outputting user information representing the estimation result;
   performing matching between a search result target pronunciation symbol string which is a sequence of pronunciation symbols representing pronunciations of a search result target word string and a recognition result pronunciation symbol string which is a sequence of pronunciation symbols representing pronunciations of a sound recognition result for the input sound for each of plural search result target word strings which are word strings as the targets of the search results for the word strings corresponding to the input sound; and
   generating a search result word string as a search result for a word string corresponding to the input sound from the plural search result target word strings based on the matching result between the search result target pronunciation symbol string and the recognition result pronunciation symbol string,
   wherein processing is changed in accordance with the user information at least during one of the performing of the matching and the generating of the search result word string.

12. A non-transitory computer readable medium encoded with a computer program which when executed causes a computer to function as:
   a sound recognition unit which recognizes input sound;
   a user information estimation unit which estimates at least one of a physical condition and emotional demeanor of a speaker of the input sound based on the input sound and outputs user information representing the estimation result;
   a matching unit which performs matching between a search result target pronunciation symbol string which is a sequence of pronunciation symbols representing pronunciations of a search result target word string and a recognition result pronunciation symbol string which is a sequence of pronunciation symbols representing pronunciations of a sound recognition result for the input sound for each of plural search result target word strings which are word strings as the targets of the search results for the word strings corresponding to the input sound; and
   a generation unit which generates a search result word string as a search result for a word string corresponding to the input sound from the plural search result target word strings based on the matching result between the search result target pronunciation symbol string and the recognition result pronunciation symbol string,
   wherein at least one of the matching unit and the generation unit changes processing in accordance with the user information.

* * * * *